United States Patent
Aygunduz

(10) Patent No.: US 11,849,206 B1
(45) Date of Patent: Dec. 19, 2023

(54) SYSTEMS AND METHODS FOR AUTOMATED OBJECT IDENTIFICATION AND TRACKING

(71) Applicant: Amazon Technologies, Inc., Seattle, WA (US)

(72) Inventor: Adnan Aygunduz, Kent, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/678,250

(22) Filed: Feb. 23, 2022

(51) Int. Cl.
| | |
|---|---|
| H04N 23/61 | (2023.01) |
| G06T 7/20 | (2017.01) |
| G06T 7/50 | (2017.01) |
| G06T 7/60 | (2017.01) |
| G06T 7/70 | (2017.01) |
| H04N 23/69 | (2023.01) |
| H04N 23/695 | (2023.01) |

(52) U.S. Cl.
CPC .............. H04N 23/61 (2023.01); G06T 7/20 (2013.01); G06T 7/50 (2017.01); G06T 7/60 (2013.01); G06T 7/70 (2017.01); H04N 23/69 (2023.01); H04N 23/695 (2023.01)

(58) Field of Classification Search
CPC .............. H04N 23/61; G06T 7/50; G06T 7/70
USPC ....................................................... 348/169
See application file for complete search history.

(56) References Cited

U.S. PATENT DOCUMENTS

| | | | | |
|---|---|---|---|---|
| 2004/0100563 | A1* | 5/2004 | Sablak | H04N 23/611 |
| | | | | 348/E7.087 |
| 2012/0154599 | A1* | 6/2012 | Huang | G08B 13/19608 |
| | | | | 348/169 |
| 2012/0218378 | A1* | 8/2012 | Takizawa | H04N 7/188 |
| | | | | 348/36 |
| 2018/0162291 | A1* | 6/2018 | Sud | G09G 5/34 |

OTHER PUBLICATIONS

B&H Foto & Electronics Corp., "Datavideo PTR-10T Mark II Robotic Pan and Tilt Head (HDBaseT)," B&H Foto & Electronics Corp., www.bhphotovideo.com, Copyright 2000-2022, URL: https://www.bhphotovideo.com/c/product/1619084-REG/datavideo_ptr_10t_mk_ii_hdbaset_robotic_pan_tilt.html/overview, (obtained Feb. 9, 2022), 3 pages.

* cited by examiner

Primary Examiner — Amir Shahnami
(74) Attorney, Agent, or Firm — Athorus, PLLC

(57) ABSTRACT

Automated object identification and tracking systems and methods may include an imaging device operatively coupled to a movable base. The movable base may include one or more actuators to adjust pan and/or tilt orientations of the movable base and imaging device, and the imaging device may include a zoom controller to adjust a zoom level of the imaging device. A controller of the movable base may receive imaging data from the imaging device, process the imaging data to identify an object, and track the object over a plurality of frames of imaging data by instructing adjustments to a pan orientation, a tilt orientation, and/or a zoom level to substantially maintain the identified object at a desired size and within a field of view of the imaging device based on a position and/or size of the object represented within the imaging data.

20 Claims, 7 Drawing Sheets

SYSTEMS AND METHODS FOR AUTOMATED OBJECT IDENTIFICATION AND TRACKING

BACKGROUND

Unmanned vehicles, such as unmanned aerial vehicles ("UAV"), are continuing to increase in use. With such increasing use, there is an increasing need for safe, efficient, and reliable control and operations of such vehicles. For example, reliable identification and tracking of UAVs is needed during design, development, and testing to enable safe, efficient, and reliable operations of UAVs. Accordingly, there is a need for improved, automated systems and methods to identify and track UAVs during design, development, and testing.

DETAILED DESCRIPTION

Figure 1:
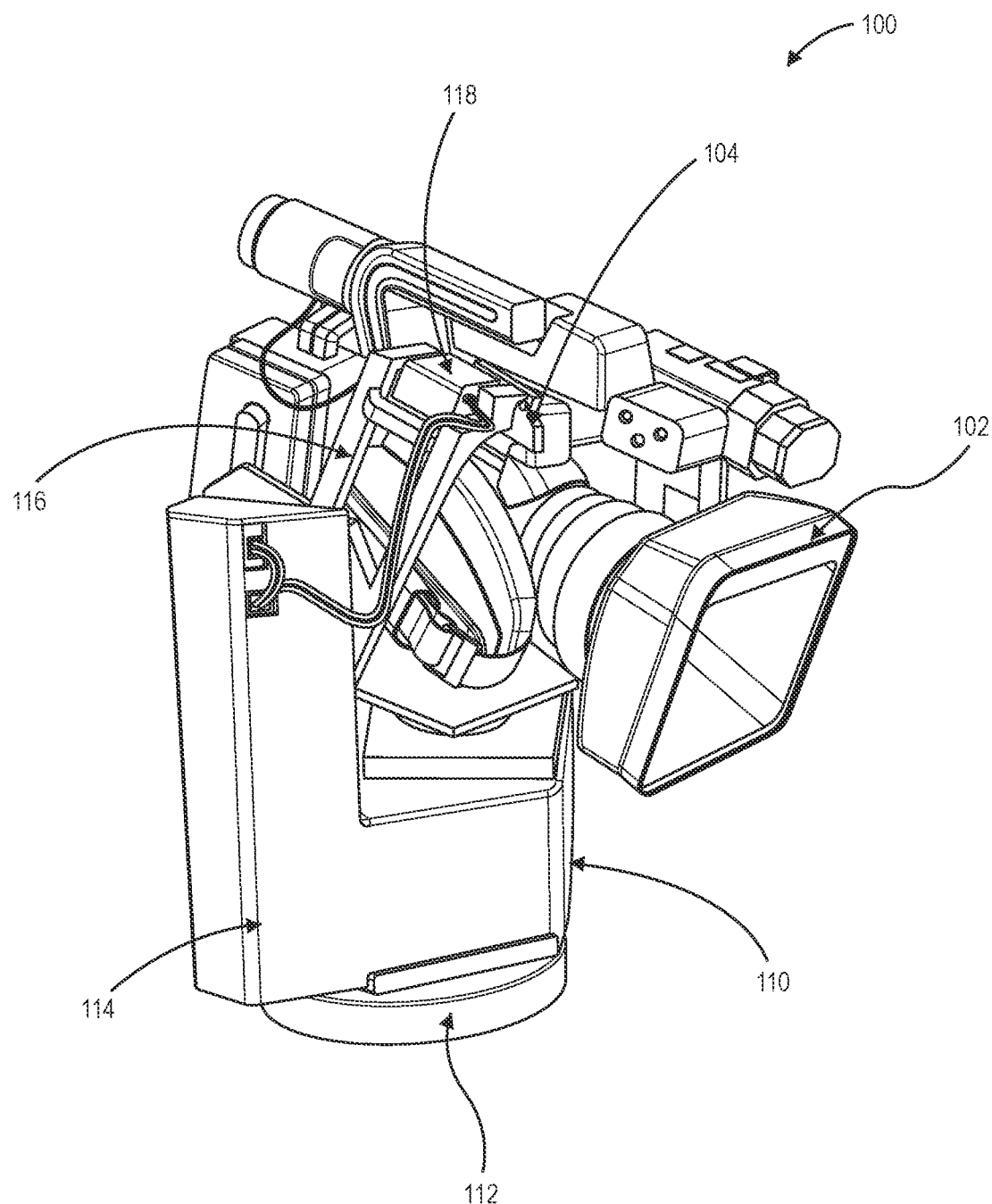
FIG. 1 is a schematic diagram of an example automated identification and tracking system, in accordance with implementations of the present disclosure.

As is set forth in greater detail below, implementations of the present disclosure are directed to automated object identification and tracking systems and methods that may reliably and efficiently identify, track, and capture imaging data of desired objects.

In example embodiments, a movable base may be configured to operatively couple to an imaging device in order to identify and track objects. The movable base may include a main computer or controller configured to receive and process imaging data from the imaging device, and also configured to determine and instruct adjustments, or movements, of the movable base. In addition, the movable base may include at least one motor or actuator to adjust a pan orientation of the imaging device along a substantially horizontal, or pan, direction. Further, the movable base may include at least one motor or actuator to adjust a tilt orientation of the imaging device along a substantially vertical, or tilt, direction. Moreover, the imaging device may include a zoom controller to adjust a zoom level, and the controller may be operatively coupled to the zoom controller to adjust the zoom level.

In example embodiments, the controller of the movable base may receive imaging data from the imaging device. The imaging data, e.g., individual frames thereof, may be processed to identify one or more objects represented within the imaging data. For example, one or more computer vision, machine learning, or other imaging data processing algorithms may be trained to identify desired objects within imaging data, and the imaging data received from the imaging device may be processed by the one or more computer vision, machine learning, or other imaging data processing algorithms.

Upon identifying an object represented within imaging data, a position, a size, and/or other characteristics of the object may be determined. In some example embodiments, a bounding box may be positioned around the identified object. Further, the position of the object may be approximated to a center of the bounding box around the object, and/or a size of the object may be approximated to an area associated with the bounding box around the object.

In order to determine adjustments to pan or tilt orientations of the movable base and imaging device, the position of the object, e.g., a center of the bounding box, may be compared with a center of a field of view of the imaging device and/or a center of a corresponding frame of the imaging data. If a distance between the position of the object and a center of the field of view or frame is greater than one or more threshold distances along the pan or tilt directions, the pan or tilt orientations may be adjusted to substantially align the position of the object with the center of the field of view or frame along the pan or tilt directions.

In order to determine adjustments to a zoom level of the imaging device, a size of the object, e.g., an area associated with the bounding box, may be compared directly with one or more thresholds, or may be compared with a size or area of a field of view of the imaging device and/or a size or area of a corresponding frame of the imaging data. If a size of the object, or a ratio, proportion, or difference between the size of the object and a size or area of the field of view or frame, is less than one or more thresholds, the zoom level may be adjusted to increase a size of the object represented within the imaging data. Likewise, if a size of the object, or a ratio, proportion, or difference between the size of the object and a size or area of the field of view or frame, is greater than one or more thresholds, the zoom level may be adjusted to decrease a size of the object represented within the imaging data.

By determining and instructing automatic adjustments to pan, tilt, and/or zoom based on position, size, and/or other characteristics of an object represented within imaging data, the movable base and imaging device may substantially automatically track and maintain an object within a field of view of the imaging device, as well as at a suitable or desired size or zoom level, even as the object may move within an environment relative to the movable base and imaging device. Furthermore, the movable base and imaging device as described herein may utilize only a single imaging device to both capture and record imaging data of an object, as well as to process and determine adjustments to the movable base in order to continuously track and record the object over multiple frames of the imaging data captured by the single imaging device.

FIG. 1 is a schematic diagram 100 of an example automated identification and tracking system, in accordance with implementations of the present disclosure.

As shown in FIG. 1, an example automated identification and tracking system may comprise an imaging device 102 and a movable base 110. The imaging device 102 may further include a zoom controller, function, or capability 104, and the movable base 110 may further include a fixed or static bed, foot, or stand 112, a pan adjustment section 114, a tilt adjustment section 116, and a zoom adjustment section 118.

In example embodiments, the imaging device 102 may comprise various types of imaging devices, such as analog cameras, digital cameras, red-green-blue (RGB) cameras, depth cameras, GoPro cameras, Raspberry Pi cameras, or other types of imaging devices. In one example embodiment, the imaging device 102 may comprise a Panasonic HC-X1 camera, or other similar types of cameras.

In additional example embodiments, the imaging device 102 may have various fields of view and/or may capture imaging data at various resolutions. For example, the field of view may be approximately 90 degrees, approximately 120 degrees, approximately 135 degrees, or various other angles or sizes of fields of view. In addition, the resolution may be approximately 640×480 pixels, approximately 1080p resolution, or various other levels of resolution. Further, the imaging device 102 may be configured to capture and output imaging data via a high definition multimedia interface (HDMI) output, or other similar interfaces, formats, or outputs.

In further example embodiments, the imaging device 102 may also include a zoom controller, function, or capability 104. For example, the zoom controller, function, or capability may include approximately 5× zoom, approximately 10× zoom, approximately 20× zoom, or other levels of zoom. In addition, the minimum focal length of the imaging device 102 may be approximately 35 mm, approximately 50 mm, approximately 60 mm, approximately 87 mm, or other focal lengths or ranges thereof. Further, the zoom function or capability may include optical zoom, digital zoom, or both.

The various characteristics or aspects of the imaging device 102 and imaging data captured by the imaging device 102 may facilitate processing of the imaging data and identification and tracking of one or more objects represented within the imaging data. For example, one or more of the field of view, image capture resolution, imaging data format, focal length, zoom function, and/or other characteristics or aspects may be selected or determined in order to capture imaging data that can be reliably and efficiently processed to identify and track one or more objects represented within the imaging data.

In example embodiments, the movable base 110 may include a fixed or static bed, foot, or stand 112. For example, the fixed bed 112 may be a plate, surface, blank, or other type of foot or stand to which various other components of the movable base 110 may be movably coupled. The fixed bed 112 may have various shapes or sizes, such as circular, oval, triangular, rectangular, square, or other shapes and sizes. In addition, the fixed bed 112 may also be coupled to another component or structure, such as a table, stand, platform, legs, tripod, or other structure, such that the movable base 110 and imaging device 102 may be placed, positioned, or supported within an environment. Further, the fixed bed 112 may be formed of various materials, such as metal, plastics, composites, other materials, or combinations thereof.

The movable base 110 may also include a pan adjustment section 114 movably coupled to the fixed bed 112. For example, the pan adjustment section 114 may be positioned or coupled on top of the fixed bed 112, and the pan adjustment section 114 may be movable or rotatable in a substantially horizontal, angular direction to adjust a pan orientation of the imaging device 102, e.g., rotatable around a substantially vertical axis relative to ground. As shown in FIG. 1, the pan adjustment section 114 may be formed as a substantially U-shaped structure that is coupled to the fixed bed 112. Other example embodiments may include other shapes or sizes of the pan adjustment section 114, such as an elbow or L-shaped, a column, post, or I-shaped, or other shapes or sizes.

In some examples, the pan adjustment section 114 may include one or more gears, tracks, belts, pulleys, or other mechanisms in combination with one or more actuators or motors to enable movement or rotation of the pan adjustment section 114 relative to the fixed bed 112. Various types of actuators or motors may be used to cause movement or rotation of the pan adjustment section 114 relative to the fixed bed 112, such as servo motors, stepper motors, brushless motors, other rotary motors, or other types of actuators.

In one example embodiment, one of the pan adjustment section 114 or the fixed bed 112 may include a motor that rotates a gear, and the other of the pan adjustment section 114 or the fixed bed 112 may include a track having teeth that mesh with teeth of the gear in order to enable movement or rotation of the pan adjustment section 114 relative to the fixed bed 112. In another example embodiment, one of the pan adjustment section 114 or the fixed bed 112 may include a motor that rotates a pulley, and the other of the pan adjustment section 114 or the fixed bed 112 may include a pulley such that a belt connected between the pulleys may enable movement or rotation of the pan adjustment section 114 relative to the fixed bed 112. In a further example embodiment, a housing or stator of a motor or actuator may be rotationally fixedly coupled to one of the pan adjustment section 114 or the fixed bed 112, and a rotor, shaft, or axle of the motor or actuator may be rotationally fixedly coupled to the other of the pan adjustment section 114 or the fixed bed 112 in order to enable movement or rotation of the pan adjustment section 114 relative to the fixed bed 112.

The pan adjustment section 114 may move or rotate relative to the fixed bed 112 by various amounts, angles, or degrees. For example, the pan adjustment section 114 may move or rotate approximately 90 degrees, approximately 135 degrees, approximately 180 degrees, approximately 360 degrees or more, substantially continuously, or various other amounts, angles, or degrees in either rotational direction relative to the fixed bed 112. Further, the pan adjustment section 114 may be formed of various materials, such as metal, plastics, composites, other materials, or combinations thereof.

The movable base 110 may also include a tilt adjustment section 116 movably coupled to the fixed bed 112 and/or the pan adjustment section 114. For example, the tilt adjustment section 116 may be attached or coupled to the pan adjustment section 114 and on top of the fixed bed 112, and the tilt adjustment section 116 may be movable or rotatable in a substantially vertical, angular direction to adjust a tilt orientation of the imaging device 102, e.g., rotatable around a substantially horizontal axis relative to ground. As shown in FIG. 1, the tilt adjustment section 116 may be formed as a substantially U-shaped structure that is coupled to the pan adjustment section 114. Other example embodiments may include other shapes or sizes of the tilt adjustment section 116, such as an elbow or L-shaped, a beam, rod, post, flat plate, surface, platform, or other shapes or sizes.

In some examples, the tilt adjustment section 116 may include one or more gears, tracks, belts, pulleys, or other mechanisms in combination with one or more actuators or motors to enable movement or rotation of the tilt adjustment section 116 relative to the pan adjustment section 114. Various types of actuators or motors may be used to cause movement or rotation of the tilt adjustment section 116 relative to the pan adjustment section 114, such as servo motors, stepper motors, brushless motors, other rotary motors, or other types of actuators.

In one example embodiment, one of the tilt adjustment section 116 or the pan adjustment section 114 may include a motor that rotates a gear, and the other of the tilt adjustment section 116 or the pan adjustment section 114 may include a track having teeth that mesh with teeth of the gear in order to enable movement or rotation of the tilt adjustment section 116 relative to the pan adjustment section 114. In another example embodiment, one of the tilt adjustment section 116 or the pan adjustment section 114 may include a motor that rotates a pulley, and the other of the tilt adjustment section 116 or the pan adjustment section 114 may include a pulley such that a belt connected between the pulleys may enable movement or rotation of the tilt adjustment section 116 relative to the pan adjustment section 114. In a further example embodiment, a housing or stator of a motor or actuator may be rotationally fixedly coupled to one of the tilt adjustment section 116 or the pan adjustment section 114, and a rotor, shaft, or axle of the motor or actuator may be rotationally fixedly coupled to the other of the tilt adjustment section 116 or the pan adjustment section 114 in order to enable movement or rotation of the tilt adjustment section 116 relative to the pan adjustment section 114.

The tilt adjustment section 116 may move or rotate relative to the pan adjustment section 114 by various amounts, angles, or degrees. For example, the tilt adjustment section 116 may move or rotate approximately 45 degrees, approximately 65 degrees, approximately 90 degrees, approximately 135 degrees, approximately 180 degrees, or various other amounts, angles, or degrees in either rotational direction relative to the pan adjustment section 114. Further, the tilt adjustment section 116 may be formed of various materials, such as metal, plastics, composites, other materials, or combinations thereof.

The movable base 110 may also include a zoom adjustment section 118 coupled to the fixed bed 112, the pan adjustment section 114, and/or the tilt adjustment section 116. For example, the zoom adjustment section 118 may be electrically and/or communicatively attached or coupled between a portion of the pan adjustment section 114 and/or the tilt adjustment section 116 and the zoom controller, function, or capability 104 of the imaging device 102. As shown in FIG. 1, the zoom adjustment section 118 may be formed as a substantially rectangular housing or component that is attached or coupled to a portion of the imaging device 102 proximate or adjacent the zoom controller 104. Other example embodiments may include other shapes, sizes, or positions of the zoom adjustment section 118.

As shown in FIG. 1, the zoom adjustment section 118 may comprise an actuator or motor that is operatively coupled to a zoom controller 104 of the imaging device 102. In some examples, the zoom controller 104 may comprise a manual zoom control button, e.g., a pivoting button or lever, or one or more individual buttons, which controls a level of zoom. In such examples, the zoom adjustment section 118 may be coupled to the zoom controller 104 in order to push or depress one or more portions of the manual zoom control button to increase zoom or decrease zoom of the imaging device 102. Various types of actuators or motors may be used to cause activation, pushing, or depressing of one or more portions of the zoom controller 104, such as servo motors, stepper motors, brushless motors, other rotary motors, solenoids, other linear actuators, or other types of actuators.

The zoom adjustment section 118 may control, adjust, or modify a level of zoom by various amounts, degrees, or percentages. For example, the zoom adjustment section 118 may control or adjust a level of zoom by instructing a desired change in the level of zoom, by instructing a desired rate of change in the level of zoom, and/or by various other amounts, degrees, or percentages, e.g., by partially depressing a portion of the zoom controller 104, by completely depressing a portion of the zoom controller 104, by depressing a portion of the zoom controller 104 for a determined amount of time, etc. Further, the zoom adjustment section 118 may be formed of various materials, such as metal, plastics, composites, other materials, or combinations thereof.

In additional example embodiments, the movable base 110 and/or one or more actuators or motors may include one or more encoders or other types of sensors to detect and determine positions of the pan adjustment section 114 and the tilt adjustment section 116 relative to each other and/or relative to the fixed bed 112. For example, for actuators or motors such as servo motors, brushless motors, or other types of motors or actuators, one or more encoders may detect and determine positions or changes in position of the pan adjustment section 114 relative to the fixed bed 112, and/or positions or changes in position of the tilt adjustment section 116 relative to the pan adjustment section 114.

Although FIG. 1 illustrates a particular number, type, configuration, or arrangement of the various components of an example automated identification and tracking system, other example embodiments may include other numbers, types, configurations, or arrangements of the various components described herein. For example, the imaging device 102 may include various other types of imaging devices or cameras, the zoom controller 104 may comprise an electronic or software-controlled switch or operation, the fixed bed 112 may have various other shapes, sizes, or configurations, the pan adjustment section 114 may have various other shapes, sizes, or configurations, and/or the tilt adjustment section 116 may have various other shapes, sizes, or configurations. In one alternative example embodiment, the tilt adjustment section 116 may be movably coupled to the fixed bed 112, and the pan adjustment section 114 may be movably coupled to the tilt adjustment section 116. Various other configurations, arrangements, modifications, or alterations of the various components described herein are possible.

Figure 2:
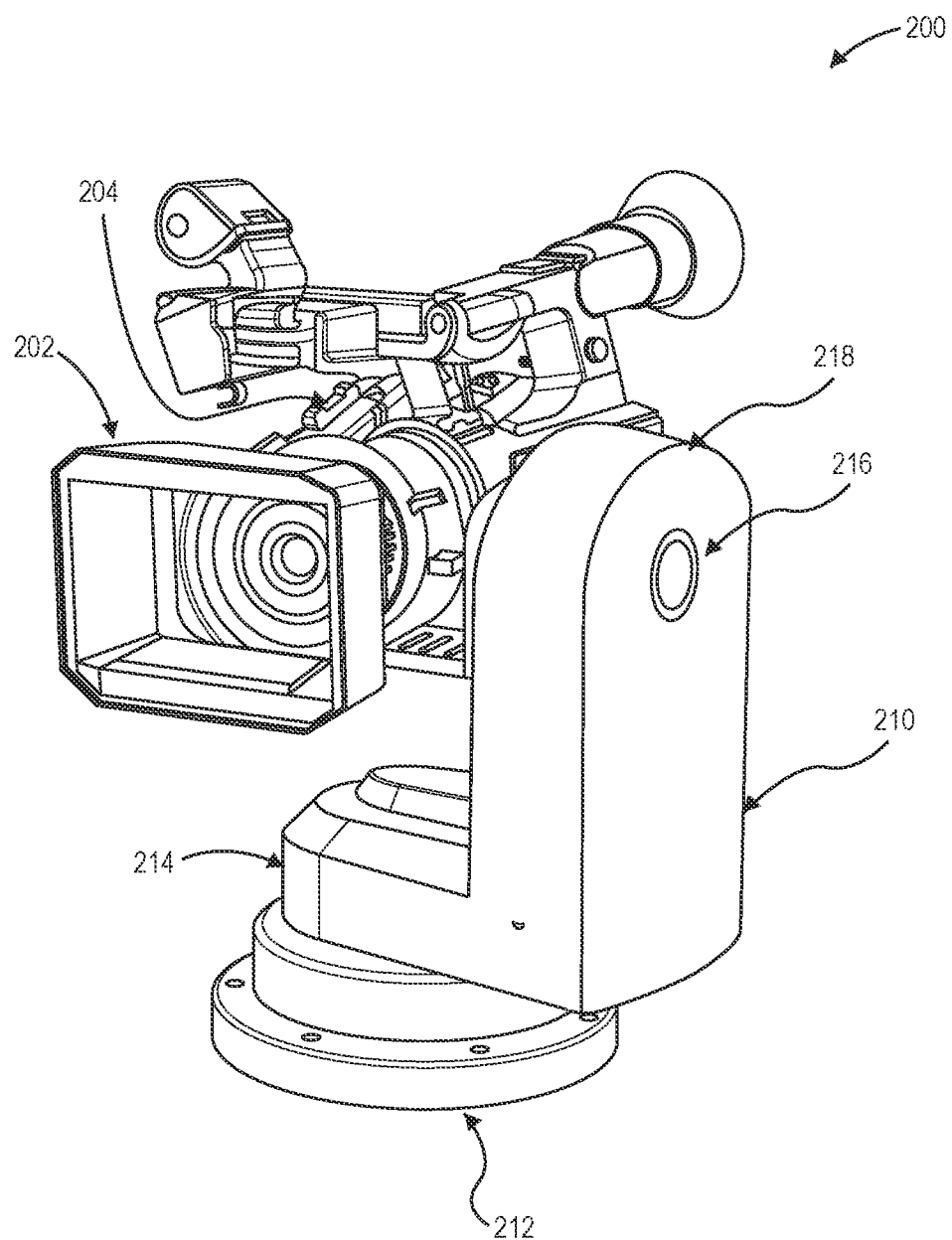
FIG. 2 is a schematic diagram of another example automated identification and tracking system, in accordance with implementations of the present disclosure.

FIG. 2 is a schematic diagram 200 of another example automated identification and tracking system, in accordance with implementations of the present disclosure.

As shown in FIG. 2, an example automated identification and tracking system may comprise an imaging device 202 and a movable base 210. The imaging device 202 may further include a zoom controller, function, or capability 204, and the movable base 210 may further include a fixed or static bed, foot, or stand 212, a pan adjustment section 214, a tilt adjustment section 216, and a zoom adjustment section 218.

In example embodiments, the imaging device 202 may comprise various types of imaging devices, such as analog cameras, digital cameras, red-green-blue (RGB) cameras, depth cameras, GoPro cameras, Raspberry Pi cameras, or other types of imaging devices. In one example embodiment, the imaging device 202 may comprise a Panasonic HC-X1 camera, or other similar types of cameras.

In additional example embodiments, the imaging device 202 may have various fields of view and/or may capture imaging data at various resolutions. For example, the field of view may be approximately 90 degrees, approximately 120 degrees, approximately 135 degrees, or various other angles or sizes of fields of view. In addition, the resolution may be approximately 640×480 pixels, approximately 1080p resolution, or various other levels of resolution. Further, the imaging device 202 may be configured to capture and output imaging data via a high definition multimedia interface (HDMI) output, or other similar interfaces, formats, or outputs.

In further example embodiments, the imaging device 202 may also include a zoom controller, function, or capability 204. For example, the zoom controller, function, or capability may include approximately 5× zoom, approximately 10× zoom, approximately 20× zoom, or other levels of zoom. In addition, the minimum focal length of the imaging device 202 may be approximately 35 mm, approximately 50 mm, approximately 60 mm, approximately 87 mm, or other focal lengths or ranges thereof. Further, the zoom function or capability may include optical zoom, digital zoom, or both, and/or the zoom function or capability may comprise an electronic or software-controlled switch, function, or operation.

The various characteristics or aspects of the imaging device 202 and imaging data captured by the imaging device 202 may facilitate processing of the imaging data and identification and tracking of one or more objects represented within the imaging data. For example, one or more of the field of view, image capture resolution, imaging data format, focal length, zoom function, and/or other characteristics or aspects may be selected or determined in order to capture imaging data that can be reliably and efficiently processed to identify and track one or more objects represented within the imaging data.

In example embodiments, the movable base 210 may include a fixed or static bed, foot, or stand 212. For example, the fixed bed 212 may be a plate, surface, blank, or other type of foot or stand to which various other components of the movable base 210 may be movably coupled. The fixed bed 212 may have various shapes or sizes, such as circular, oval, triangular, rectangular, square, or other shapes and sizes. In addition, the fixed bed 212 may also be coupled to another component or structure, such as a table, stand, platform, legs, tripod, or other structure, such that the movable base 210 and imaging device 202 may be placed, positioned, or supported within an environment. Further, the fixed bed 212 may be formed of various materials, such as metal, plastics, composites, other materials, or combinations thereof.

The movable base 210 may also include a pan adjustment section 214 movably coupled to the fixed bed 212. For example, the pan adjustment section 214 may be positioned or coupled on top of the fixed bed 212, and the pan adjustment section 214 may be movable or rotatable in a substantially horizontal, angular direction to adjust a pan orientation of the imaging device 202, e.g., rotatable around a substantially vertical axis relative to ground. As shown in FIG. 2, the pan adjustment section 214 may be formed as a substantially elbow or L-shaped structure that is coupled to the fixed bed 212. Other example embodiments may include other shapes or sizes of the pan adjustment section 214, such as a basket or U-shaped, a column, post, or I-shaped, or other shapes or sizes.

In some examples, the pan adjustment section 214 may include one or more gears, tracks, belts, pulleys, or other mechanisms in combination with one or more actuators or motors to enable movement or rotation of the pan adjustment section 214 relative to the fixed bed 212. Various types of actuators or motors may be used to cause movement or rotation of the pan adjustment section 214 relative to the fixed bed 212, such as servo motors, stepper motors, brushless motors, other rotary motors, or other types of actuators.

In one example embodiment, one of the pan adjustment section 214 or the fixed bed 212 may include a motor that rotates a gear, and the other of the pan adjustment section 214 or the fixed bed 212 may include a track having teeth that mesh with teeth of the gear in order to enable movement or rotation of the pan adjustment section 214 relative to the fixed bed 212. In another example embodiment, one of the pan adjustment section 214 or the fixed bed 212 may include a motor that rotates a pulley, and the other of the pan adjustment section 214 or the fixed bed 212 may include a pulley such that a belt connected between the pulleys may enable movement or rotation of the pan adjustment section 214 relative to the fixed bed 212. In a further example embodiment, a housing or stator of a motor or actuator may be rotationally fixedly coupled to one of the pan adjustment section 214 or the fixed bed 212, and a rotor, shaft, or axle of the motor or actuator may be rotationally fixedly coupled to the other of the pan adjustment section 214 or the fixed bed 212 in order to enable movement or rotation of the pan adjustment section 214 relative to the fixed bed 212.

The pan adjustment section 214 may move or rotate relative to the fixed bed 212 by various amounts, angles, or degrees. For example, the pan adjustment section 214 may move or rotate approximately 90 degrees, approximately 135 degrees, approximately 180 degrees, approximately 360 degrees or more, substantially continuously, or various other amounts, angles, or degrees in either rotational direction relative to the fixed bed 212. Further, the pan adjustment section 214 may be formed of various materials, such as metal, plastics, composites, other materials, or combinations thereof.

The movable base 210 may also include a tilt adjustment section 216 movably coupled to the fixed bed 212 and/or the pan adjustment section 214. For example, the tilt adjustment section 216 may be attached or coupled to the pan adjustment section 214 and on top of the fixed bed 212, and the tilt adjustment section 216 may be movable or rotatable in a substantially vertical, angular direction to adjust a tilt orientation of the imaging device 202, e.g., rotatable around a substantially horizontal axis relative to ground. As shown in FIG. 2, the tilt adjustment section 216 may be formed as a substantially elbow or L-shaped structure that is coupled to the pan adjustment section 214. Other example embodiments may include other shapes or sizes of the tilt adjustment section 216, such as a basket or U-shaped, a beam, rod, post, flat plate, surface, platform, or other shapes or sizes.

In some examples, the tilt adjustment section 216 may include one or more gears, tracks, belts, pulleys, or other mechanisms in combination with one or more actuators or motors to enable movement or rotation of the tilt adjustment section 216 relative to the pan adjustment section 214. Various types of actuators or motors may be used to cause movement or rotation of the tilt adjustment section 216 relative to the pan adjustment section 214, such as servo motors, stepper motors, brushless motors, other rotary motors, or other types of actuators.

In one example embodiment, one of the tilt adjustment section 216 or the pan adjustment section 214 may include a motor that rotates a gear, and the other of the tilt adjustment section 216 or the pan adjustment section 214 may include a track having teeth that mesh with teeth of the gear in order to enable movement or rotation of the tilt adjustment section 216 relative to the pan adjustment section 214. In another example embodiment, one of the tilt adjustment section 216 or the pan adjustment section 214 may include a motor that rotates a pulley, and the other of the tilt adjustment section 216 or the pan adjustment section 214 may include a pulley such that a belt connected between the pulleys may enable movement or rotation of the tilt adjustment section 216 relative to the pan adjustment section 214. In a further example embodiment, a housing or stator of a motor or actuator may be rotationally fixedly coupled to one of the tilt adjustment section 216 or the pan adjustment section 214, and a rotor, shaft, or axle of the motor or actuator may be rotationally fixedly coupled to the other of the tilt adjustment section 216 or the pan adjustment section 214 in order to enable movement or rotation of the tilt adjustment section 216 relative to the pan adjustment section 214.

The tilt adjustment section 216 may move or rotate relative to the pan adjustment section 214 by various amounts, angles, or degrees. For example, the tilt adjustment section 216 may move or rotate approximately 45 degrees, approximately 65 degrees, approximately 90 degrees, approximately 135 degrees, approximately 180 degrees, or various other amounts, angles, or degrees in either rotational direction relative to the pan adjustment section 214. Further, the tilt adjustment section 216 may be formed of various materials, such as metal, plastics, composites, other materials, or combinations thereof.

The movable base 210 may also include a zoom adjustment section 218 coupled to the fixed bed 212, the pan adjustment section 214, and/or the tilt adjustment section 216. For example, the zoom adjustment section 218 may be electrically and/or communicatively attached or coupled between a controller or other portion of the movable base 210 and the zoom controller, function, or capability 204 of the imaging device 202. As shown in FIG. 2 and as further described herein at least with respect to FIG. 3, the zoom controller 204 may comprise an electronic or software-controlled switch, function, or operation associated with the imaging device 202, and the zoom adjustment section 218 may comprise a zoom control card and associated electrical, electronic, or other communication connection between the main computer, controller, or other portion of the movable base 210 and the zoom controller 204 of the imaging device 202.

As shown in FIG. 2 and similar to the description herein at least with respect to FIG. 1, the zoom controller 204 may also comprise a manual zoom control button, e.g., a pivoting button or lever, or one or more individual buttons, that controls a level of zoom. As described herein, in alternative example embodiments, the zoom adjustment section 218 may alternatively, or in addition, be coupled to the zoom controller 204 in order to push or depress one or more portions of the manual zoom control button to increase zoom or decrease zoom of the imaging device 202. Various types of actuators or motors may be used to cause activation, pushing, or depressing of one or more portions of the zoom controller 204, such as servo motors, stepper motors, brushless motors, other rotary motors, solenoids, other linear actuators, or other types of actuators.

The zoom adjustment section 218 may control, adjust, or modify a level of zoom by various amounts, degrees, or percentages. For example, the zoom adjustment section 218 may control or adjust a level of zoom by instructing a desired change in the level of zoom, instructing a desired rate of change in the level of zoom, or by instructing various other amounts, degrees, or percentages related to the level of zoom.

In additional example embodiments, the movable base 210 and/or one or more actuators or motors may include one or more encoders or other types of sensors to detect and determine positions of the pan adjustment section 214 and the tilt adjustment section 216 relative to each other and/or relative to the fixed bed 212. For example, for actuators or motors such as servo motors, brushless motors, or other types of motors or actuators, one or more encoders may detect and determine positions or changes in position of the pan adjustment section 214 relative to the fixed bed 212, and/or positions or changes in position of the tilt adjustment section 216 relative to the pan adjustment section 214.

Although FIG. 2 illustrates a particular number, type, configuration, or arrangement of the various components of an example automated identification and tracking system, other example embodiments may include other numbers, types, configurations, or arrangements of the various components described herein. For example, the imaging device 202 may include various other types of imaging devices or cameras, the fixed bed 212 may have various other shapes, sizes, or configurations, the pan adjustment section 214 may have various other shapes, sizes, or configurations, and/or the tilt adjustment section 216 may have various other shapes, sizes, or configurations. In one alternative example embodiment, the tilt adjustment section 216 may be movably coupled to the fixed bed 212, and the pan adjustment section 214 may be movably coupled to the tilt adjustment section 216. Various other configurations, arrangements, modifications, or alterations of the various components described herein are possible.

Figure 3:
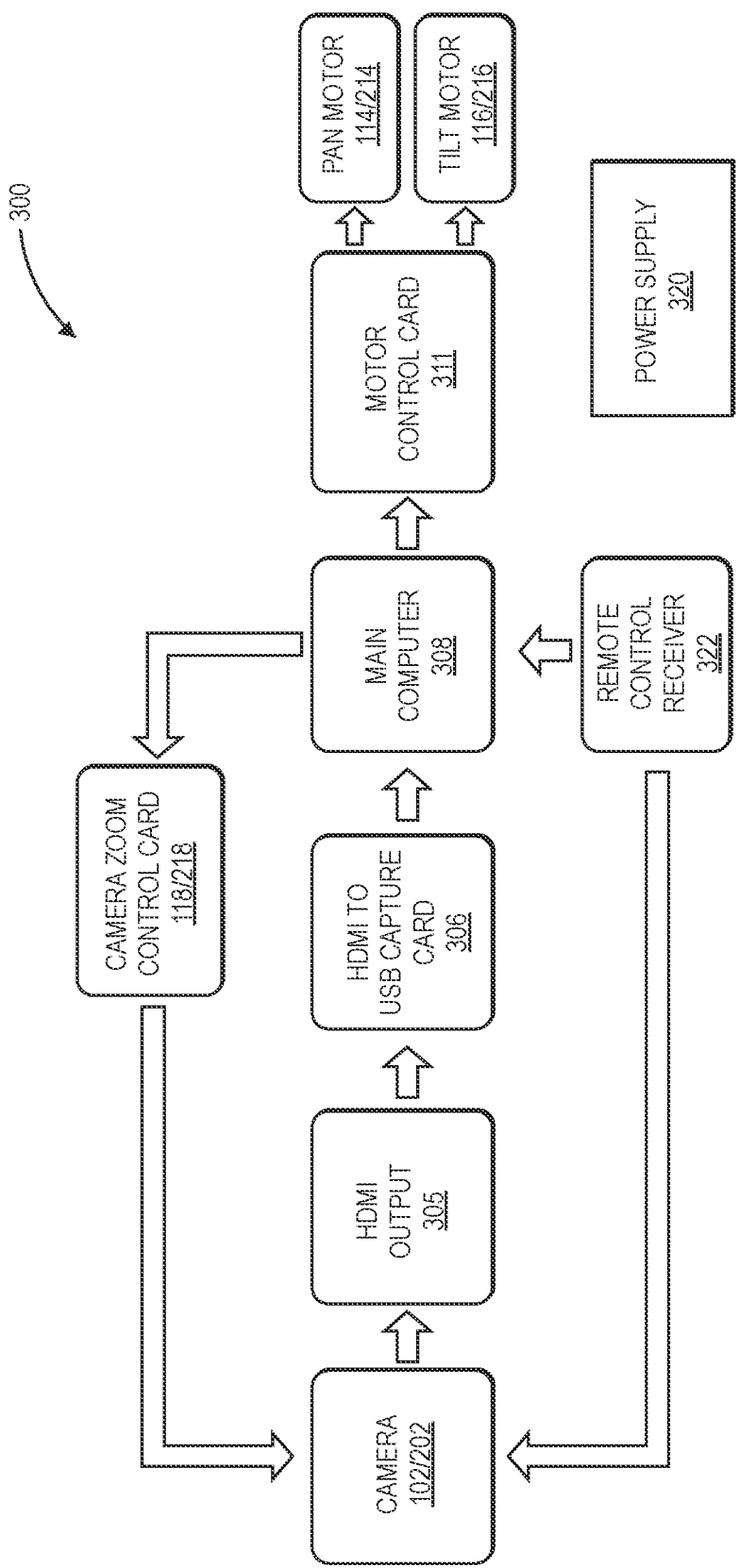
FIG. 3 is a block diagram of an example automated identification and tracking system, in accordance with implementations of the present disclosure.

FIG. 3 is a block diagram 300 of an example automated identification and tracking system, in accordance with implementations of the present disclosure. Various components schematically illustrated in FIG. 3 and having reference numerals similar to those used with reference to FIGS. 1 and 2 may include any and all of the features of such components as described herein at least with respect to FIGS. 1 and 2.

As shown in FIG. 3, a camera or imaging device 102, 202 may be attached or coupled to a movable base 110, 210. Each of the camera or imaging device 102, 202 and the movable base 110, 210 may include or be associated with at least a portion of a high definition multimedia interface (HDMI) output 305 in order to enable communication therebetween. In addition, the movable base 110, 210 may also include or be associated with an HDMI to universal serial bus (USB) capture card 306, a main computer or controller 308, a motor control card 311, a pan motor 114, 214, a tilt motor 116, 216, a camera zoom control card 118, 218, a remote control receiver 322, and a power supply 320. Moreover, the power supply 320 may provide power to any of the components included within or associated with the movable base 110, 210, such as controllers, control cards, motors, or other components. Further, the camera or imaging device 102, 202 may also be electrically connected to the movable base 110, 210 in order to receive power from the power supply 320, as well as to receive instructions, commands, or other data from the camera zoom control card 118, 218, the main computer 308, and/or the remote control receiver 322.

In example embodiments, the camera or imaging device 102, 202 may have various characteristics, such as field of view, image capture resolution, imaging data format, focal length, zoom function, and/or other characteristics or aspects, and may be utilized to capture imaging data within an environment. The environment may be various types of environments, including outdoor environments, indoor environments, other environments, or combinations thereof. The imaging data may comprise one or more, e.g., a plurality, of frames of imaging data. Further, the imaging data may be captured with a selected or desired frame rate, or image capture frequency.

The camera or imaging device 102, 202 may transfer, output, or communicate the imaging data via the HDMI output 305 to the HDMI to USB capture card 306 and the main computer or controller 308. For example, the imaging data may be captured by the imaging device 102, 202, and provided in an HDMI format or output to a main computer or controller 308 associated with the movable base 110, 210 via the HDMI to USB capture card.

The main computer or controller 308 may receive and process the imaging data using one or more computer vision algorithms, machine learning algorithms, and/or other types of imaging data processing algorithms. For example, the computer vision, machine learning, or other imaging data processing algorithms may be trained to detect one or more objects that may be represented within the imaging data. In one example embodiment, the computer vision algorithm may comprise a PyTorch-based YOLOv5 (You Only Look Once) algorithm, or other similar types of algorithms. Using such algorithms, the controller 308 may process the imaging data to identify an object as desired. As further described herein, the controller 308 may process one or more frames of imaging data over time to maintain the identified object within the field of view of the imaging device, i.e., to track the identified object over a plurality of frames of imaging data, by adjusting one or more of a pan orientation, a tilt orientation, or a zoom level of the imaging device to maintain the identified object within the field of view.

The main computer, control system, or controller 308 may include one or more processors, e.g., graphics processing units, coupled to a non-transitory computer-readable storage medium or memory via an input/output (I/O) interface. The controller 308 may further include a network interface coupled to the I/O interface, and one or more input/output devices, such as the HDMI to USB capture card 306, the motor control card 311, the camera zoom control card 118, 218, and/or other input/output devices.

In various implementations, the controller 308 may be a uniprocessor system including one processor, or a multiprocessor system including several processors (e.g., two, four, eight, or another suitable number). The processors may be any suitable processor capable of executing the functions and processes described herein, such as graphics processing units. For example, in various implementations, the processors may be general-purpose or embedded processors implementing any of a variety of instruction set architectures (ISAs), such as the x86, PowerPC, SPARC, or MIPS ISAs, or any other suitable ISA. In multiprocessor systems, each of the processors may commonly, but not necessarily, implement the same ISA. In one example embodiment, the processors may comprise a Jetson Nano computer having graphics processing units, or other similar types of processors.

The non-transitory computer-readable storage medium or memory may be configured to store executable instructions and/or data accessible by the one or more processors. In various implementations, the non-transitory computer-readable storage medium may be implemented using any suitable memory technology, such as static random-access memory (SRAM), synchronous dynamic random-access memory (SDRAM), nonvolatile/Flash-type memory, or any other type of memory. In some implementations, program instructions and data implementing desired functions and/or processes, such as those described herein, may be stored within the non-transitory computer-readable storage medium as program instructions and data storage, respectively. In other implementations, program instructions and/or data may be received, sent or stored upon different types of computer-accessible media, such as non-transitory media, or on similar media separate from the non-transitory computer-readable storage medium or the controller 308. Generally speaking, a non-transitory, computer-readable storage medium may include storage media or memory media such as magnetic or optical media, e.g., disk or CD/DVD-ROM, coupled to the controller 308 via the I/O interface. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface.

In one implementation, the I/O interface may be configured to coordinate I/O traffic between the processors, the non-transitory computer-readable storage medium, and any peripheral devices, including the network interface or other peripheral interfaces, such as input/output devices. In some implementations, the I/O interface may perform any necessary protocol, timing or other data transformations to convert data signals from one component (e.g., non-transitory computer-readable storage medium) into a format suitable for use by another component (e.g., processors). In some implementations, the I/O interface may include support for devices attached through various types of peripheral buses, such as a variant of the Peripheral Component Interconnect (PCI) bus standard or the Universal Serial Bus (USB) standard, for example. In some implementations, the function of the I/O interface may be split into two or more separate components, such as a north bridge and a south bridge, for example. Also, in some implementations, some or all of the functionality of the I/O interface, such as an interface to the non-transitory computer-readable storage medium, may be incorporated directly into the processors.

The network interface may be configured to allow data to be exchanged between the controller 308 and other devices attached to a network, such as cameras, zoom controllers of cameras, actuators or motors, remote control receivers, other control systems, other computer systems, various types of sensors, various other types of vision systems, imaging devices, or imaging sensors, or between nodes of the controller 308. In various implementations, the network interface may support communication via wired or wireless general data networks, such as any suitable type of Ethernet network.

Input/output devices may, in some implementations, include one or more displays, monitors, projection devices, other visual input/output devices, microphones, speakers, other audio input/output devices, keyboards, keypads, touchpads, scanning devices, imaging devices, sensors, photo eyes, proximity sensors, RFID readers, voice or optical recognition devices, remote control receivers, or any other devices suitable for entering or retrieving data by one or more controllers 308. Multiple input/output devices may be present in the controller 308 or may be distributed on various nodes of the controller 308. In some implementations, similar input/output devices may be separate from the controller 308 and may interact with one or more nodes of the controller 308 through a wired or wireless connection, such as over the network interface.

The non-transitory computer-readable storage medium or memory may include program instructions that may be configured to implement one or more of the described implementations and/or provide data storage, which may comprise various tables, data stores and/or other data structures accessible by the program instructions. The program instructions may include various executable instructions, programs, or applications, such as imaging device controllers, drivers, or applications, imaging data capture card controllers, drivers, or applications, actuator or motor control card controllers, drivers, or applications, camera zoom control card controllers, drivers, or applications, computer vision algorithms, machine learning algorithms, other imaging data processing algorithms, remote control receiver controllers, drivers, or applications, or various other controllers, drivers, or applications, etc. The data storage may include various data stores for maintaining data related to systems, operations, or processes described herein, such as imaging devices, movable bases, pan adjustment sections, tilt adjustment sections, zoom adjustment sections, capture cards, actuators or motors, control cards, imaging data, objects, bounding boxes, position data, size or area data, etc.

Those skilled in the art will appreciate that the controller 308 is merely exemplary and is not intended to limit the scope of implementations. In particular, the control system and devices may include any combination of hardware or software that can perform the indicated functions, including other control systems or controllers, computers, network devices, internet appliances, robotic devices, etc. The controller 308 may also be connected to other devices that are not illustrated, or instead may operate as a stand-alone system. In addition, the functionality provided by the components may, in some implementations, be combined in fewer components or distributed in additional components. Similarly, in some implementations, the functionality of some of the components may not be provided and/or other additional functionality may be available.

As described herein, the controller 308 may process one or more frames of imaging data over time in order to track an identified object over a plurality of frames of imaging data. In example embodiments, upon identifying an object to be tracked over a plurality of frames of imaging data, a bounding box may be positioned around the identified object that substantially surrounds or encloses the object. For example, the bounding box may be positioned such that an outer periphery of the object is substantially or completely enclosed within the bounding box.

The controller 308 may further process the imaging data having the bounding box overlaid onto the identified object in order to determine whether to instruct any adjustments to a pan orientation, a tilt orientation, or a zoom level associated with the imaging device coupled to the movable base.

In example embodiments, the controller 308 may determine a position of the object within a frame of imaging data. For example, the position of the object may be approximated to a center of the bounding box. In other example embodiments, the position of the object may be calculated or determined in other manners, such as a corner of the bounding box, a midpoint of a side or edge of the bounding box, or other portion of the bounding box or the identified object.

Then, the position of the object may be compared to a center of a field of view, or a center of the frame of imaging data along a pan direction, e.g., a horizontal direction substantially parallel with ground. If the position of the object is greater than a threshold distance from the center of the field of view or center of the frame of imaging data along the pan direction, it may be determined to adjust a pan orientation of the imaging device and movable base to at least partially align the position of the object with the center of the field of view or center of the frame of imaging data. In various examples, the threshold distance may be a number of pixels, e.g., 40 pixels, 60 pixels, 80 pixels, 100 pixels, or other numbers of pixels, away from the center of the field of view or center of the frame along the pan direction. In other examples, the threshold distance may be expressed as a ratio, proportion, or percentage relative to a total width, or half the width, of the field of view or frame along the pan direction. Various other example values or amounts may be used to define a threshold distance to initiate adjustment of the pan orientation of the imaging device and movable base.

In example embodiments, the adjustment to the pan direction may be substantially equal to the distance between the position of the object and the center of the field of view or center of the frame, such that the position of the object may be substantially aligned with the center of the field of view or center of the frame along the pan direction. In other example embodiments, the adjustment to the pan direction may be some other value, amount, ratio, proportion, or percentage, e.g., 90%, 80%, 70%, 50%, or other values, ratios, or percentages, of the distance between the position of the object and the center of the field of view or center of the frame, such that the position of the object may be moved closer to the center of the field of view or center of the frame along the pan direction.

As further shown in FIG. 3, if it is determined that an adjustment to the pan orientation is to be instructed, the controller 308 may instruct the pan motor 114, 214 to perform or execute the determined adjustment via the motor control card 311. In this manner, the controller 308 and motor control card 311 may substantially maintain an identified object within a field of view of the imaging device 102, 202, e.g., substantially or approximately centered within the field of view along the pan direction, by instructing adjustments to the pan orientation using the pan motor 114, 214 associated with the movable base.

In addition, the position of the object may be compared to a center of a field of view, or a center of the frame of imaging data along a tilt direction, e.g., a vertical direction substantially perpendicular to ground. If the position of the object is greater than a threshold distance from the center of the field of view or center of the frame of imaging data along the tilt direction, it may be determined to adjust a tilt orientation of the imaging device and movable base to at least partially align the position of the object with the center of the field of view or center of the frame of imaging data. In various examples, the threshold distance may be a number of pixels, e.g., 40 pixels, 60 pixels, 80 pixels, 100 pixels, or other numbers of pixels, away from the center of the field of view or center of the frame along the tilt direction. In other examples, the threshold distance may be expressed as a ratio, proportion, or percentage relative to a total height, or half the height, of the field of view or frame along the tilt direction. Various other example values or amounts may be used to define a threshold distance to initiate adjustment of the tilt orientation of the imaging device and movable base.

In example embodiments, the adjustment to the tilt direction may be substantially equal to the distance between the position of the object and the center of the field of view or center of the frame, such that the position of the object may be substantially aligned with the center of the field of view or center of the frame along the tilt direction. In other example embodiments, the adjustment to the tilt direction may be some other value, amount, ratio, proportion, or percentage, e.g., 90%, 80%, 70%, 50%, or other values, ratios, or percentages, of the distance between the position of the object and the center of the field of view or center of the frame, such that the position of the object may be moved closer to the center of the field of view or center of the frame along the tilt direction.

As further shown in FIG. 3, if it is determined that an adjustment to the tilt orientation is to be instructed, the controller 308 may instruct the tilt motor 116, 216 to perform or execute the determined adjustment via the motor control card 311. In this manner, the controller 308 and motor control card 311 may substantially maintain an identified object within a field of view of the imaging device 102, 202, e.g., substantially or approximately centered within the field of view along the tilt direction, by instructing adjustments to the tilt orientation using the tilt motor 116, 216 associated with the movable base.

In additional example embodiments, the controller 308 may determine a size of the object within a frame of imaging data. For example, the size of the object may be approximated to an area of the bounding box. In other example embodiments, the size of the object may be calculated or determined in other manners, such as a width of the bounding box, a height of the bounding box, a diagonal dimension of the bounding box, a perimeter of the bounding box, or other calculation or approximation of one or more portions of the bounding box or the identified object.

Then, the size of the object may be compared to one or more threshold values or amounts. If the size of the object is less than a threshold value or amount, it may be determined to adjust a zoom level of the imaging device to increase the zoom level, and correspondingly increase a size of the object represented within the imaging data. Likewise, if the size of the object is greater than a threshold value or amount, it may be determined to adjust a zoom level of the imaging device to decrease the zoom level, and correspondingly decrease a size of the object represented within the imaging data. In various examples, the threshold value or amount may be a number of square pixels, e.g., 3000 square pixels, 4000 square pixels, 5000 square pixels, or other numbers of square pixels, associated with an area of the bounding box positioned around the identified object. In other examples, the threshold value or amount may be expressed as a ratio, proportion, or percentage relative to a total area or size of the field of view or frame. Various other example values or amounts may be used to define a threshold value or amount to initiate adjustment of the zoom level of the imaging device.

In additional example embodiments, the size of the object may be compared to an area or size of a field of view, or an area or size of the frame of imaging data, e.g., a total or maximum area or size of the frame. If the size of the object is less than a threshold value or amount compared to the area or size of the field of view or the frame of imaging data, it may be determined to adjust a zoom level of the imaging device to increase the zoom level, and correspondingly increase a size of the object represented within the imaging data. Likewise, if the size of the object is greater than a threshold value or amount compared to the area or size of the field of view or the frame of imaging data, it may be determined to adjust a zoom level of the imaging device to decrease the zoom level, and correspondingly decrease a size of the object represented within the imaging data. In such examples, the threshold value or amount may be expressed as a ratio, proportion, or percentage relative to a total area or size of the field of view or frame. Various other example values or amounts may be used to define a threshold value or amount to initiate adjustment of the zoom level of the imaging device.

In additional example embodiments, a first threshold value may be used to determine whether to increase a zoom level of the imaging device, and a second threshold value different from the first threshold value may be used to determine whether to decrease a zoom level of the imaging device. For example, the first threshold value may be less than the second threshold value to avoid or prevent frequent, repetitive, or continuous adjustment of the zoom level. In some examples, the first threshold value may be approximately 3000 square pixels, and the second threshold value may be approximately 5000 square pixels. Other examples may include other combinations of first and second threshold values associated with increasing and decreasing a zoom level, respectively.

In example embodiments, the adjustment to the zoom level may be substantially equal to or greater than a difference between the size of the object and the threshold value associated with adjusting the zoom level, such that the size of the object may be increased or decreased relative to a total area or size of the field of view or frame. In other example embodiments, the adjustment to the zoom level may be some other value, amount, ratio, proportion, or percentage, e.g., to increase or decrease a size of the object to an approximate midpoint size or area between first and second thresholds, such that the size of the object may be adjusted to reduce or minimize frequent, repetitive, or continuous adjustment of the zoom level.

As further shown in FIG. 3, if it is determined that an adjustment to the zoom level is to be instructed, the controller 308 may instruct the zoom controller of the imaging device 102, 202 to perform or execute the determined adjustment via the camera zoom control card 118, 218. In this manner, the controller 308 and camera zoom control card 118, 218 may substantially maintain an identified object at a desired size within a field of view of the imaging device 102, 202, by instructing adjustments to the zoom level using the zoom controller, operation, or function associated with the imaging device 102, 202.

As described herein, the power supply 320 may provide power to any of the components included within or associated with the movable base 110, 210, such as controllers, control cards, motors, or other components. Further, the camera or imaging device 102, 202 may also be electrically connected to the movable base 110, 210 in order to receive power from the power supply 320, as well as to receive instructions, commands, or other data from the camera zoom control card 118, 218, controller 308, and/or the remote control receiver 322. The power supply 320 may comprise various types of power sources or supplies, such as batteries, rechargeable batteries, wired connections to main power sources, wireless connections to main power sources, solar power sources, or other types of power sources or supplies.

The remote control receiver 322 may be configured to initiate activation and provision of power from the power supply 320 to the imaging device 102, 202 and various components of the movable base, including controllers, control cards, motors, or other components. For example, the remote control receiver 322 may be used to initiate activation and deactivation of the example automated identification and tracking system as a unit, via a wired or wireless communication connection with the main computer or controller 308. Further, the remote control receiver 322 may include one or more buttons, input elements, touchscreens, or actuatable elements to cause actuation of the pan motor 114, 214 and/or the tilt motor 116, 216, and/or to cause actuation of a zoom controller of the imaging device 102, 202, via the motor control card 311 and the camera zoom control card 118, 218, respectively.

In some example embodiments, the remote control receiver 322 may be used to select, set, or determine a position and orientation of the movable base and imaging device in order to identify and track one or more objects. For example, a user may adjust a pan orientation, a tilt orientation, and/or a zoom level of the movable base and imaging device to position an object within a field of view of the imaging device as an initial step, and then, the imaging device and movable base may be activated to automatically identify and track the object over time.

In other example embodiments, a user may provide initial inputs related to a pan orientation, a tilt orientation, and/or a zoom level of the movable base and imaging device, and the movable base may receive and process the inputs and automatically adjust the pan orientation, the tilt orientation, and/or the zoom level of the movable base and imaging device based on the inputs. Such inputs may be associated with a known or expected position and orientation of an object to be identified and tracked. For example, known or expected positions and orientations for a UAV to be tracked may be associated with takeoff locations, landing locations, relay locations, holding locations, or other locations before, during, or after one or more flight or test operations. Then, the imaging device and movable base may proceed to automatically identify and track the object over time.

In further example embodiments, the movable base may also include one or more inertial measurement units, accelerometers, gyroscopes, magnetometers, and/or other position and orientation sensors to determine absolute and/or relative positions of the movable base and imaging device within an environment. Then, responsive to inputs or coordinates related to a pan orientation, a tilt orientation, and/or a zoom level of the movable base and imaging device, the movable base may receive and process the inputs and automatically adjust the pan orientation, the tilt orientation, and/or the zoom level of the movable base and imaging device based on the inputs and also based on data received from the position and orientation sensors associated with the movable base. As described herein, such inputs may be associated with a known or expected position and orientation of an object to be identified and tracked. For example, known or expected positions and orientations for a UAV to be tracked may be associated with takeoff locations, landing locations, relay locations, holding locations, or other locations before, during, or after one or more flight or test operations. Then, the imaging device and movable base may proceed to automatically identify and track the object over time.

Further, based on data received from the position and orientation sensors associated with the movable base, absolute and/or relative position and orientation of an object to be tracked, e.g., relative to a position and orientation of the movable base and imaging device, may also be determined, calculated, approximated, and/or tracked over time.

Although FIG. 3 illustrates a particular number, type, configuration, or arrangement of the various components of an example automated identification and tracking system, other example embodiments may include other numbers, types, configurations, or arrangements of the various components described herein. For example, various components may be in communication with one or more additional components. In addition, separate or additional power supplies may be provided and electrically connected to various individual components or groups of components. Further, various other components may be included, such as position and orientation sensors, other types of sensors, power shutoff circuits or devices, additional or external storage devices or memories, additional wired or wireless data, power, or communication connections to other devices or systems, etc. Various other configurations, arrangements, modifications, or alterations of the various components described herein are possible.

Figure 4:
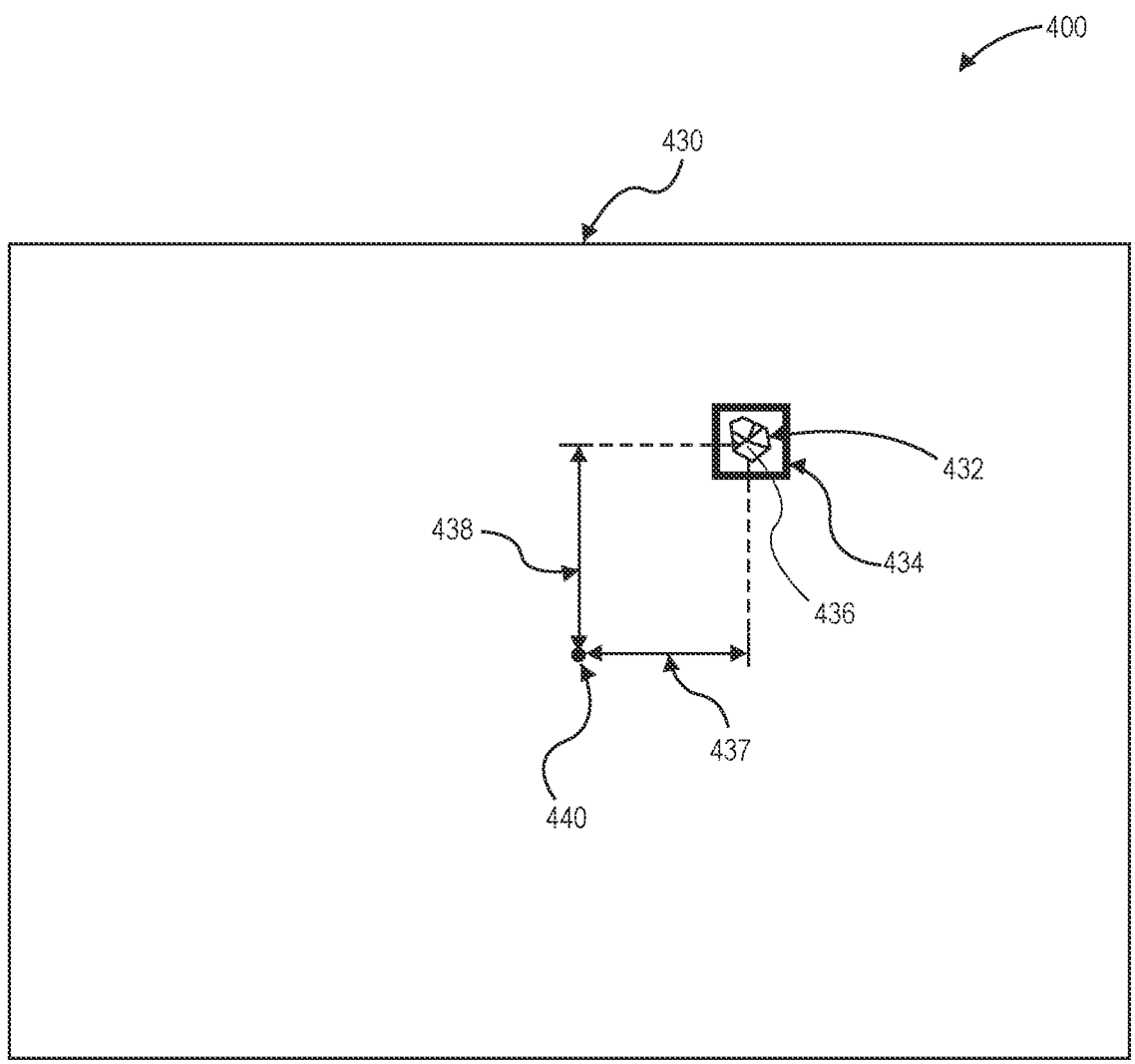
FIG. 4 is a schematic diagram of example imaging data to identify and track objects, in accordance with implementations of the present disclosure.

FIG. 4 is a schematic diagram 400 of example imaging data to identify and track objects, in accordance with implementations of the present disclosure.

As shown in FIG. 4, a frame 430 of imaging data may be processed by a computer vision, machine learning, or other imaging data processing algorithm to identify an object to be tracked. The computer vision, machine learning, or other imaging data processing algorithm may have been previously trained to identify one or more objects, e.g., a UAV or various other types of objects. In one example embodiment, the computer vision algorithm may comprise a PyTorch-based YOLOv5 (You Only Look Once) algorithm, or other similar types of algorithms.

Upon processing the frame 430 of imaging data, an object 432, e.g., a UAV, may be identified within the frame 430. In addition, the computer vision, machine learning, or other imaging data processing algorithm may generate a confidence level that is associated with the identification of the object 432, in which the confidence level may be an approximate indication of the precision or accuracy associated with the identification. In some example embodiments, if multiple objects are identified within a frame 430 of imaging data, an object having a highest confidence level may be selected for further identification and tracking over a plurality of frames of the imaging data, e.g., effectively filtering out other identified objects having relatively lower confidence levels.

Upon identifying and selecting an object 432, a bounding box 434 may be positioned around the identified object 432 that substantially surrounds or encloses the object 432. For example, the bounding box 434 may be sized and shaped to substantially surround or enclose an outer periphery of the object 432. Then, the frame 430 of imaging data having the overlaid bounding box 434 over or around the object 432 may be further processed to determine whether to instruct any adjustments to a pan orientation, a tilt orientation, and/or a zoom level.

In example embodiments, a position of the object 432 within the frame 430 of imaging data may be determined. For example, the position of the object 432 may be approximated to a center 436 of the bounding box 434. In other example embodiments, the position of the object 432 may be calculated or determined in other manners, such as a corner of the bounding box 434, a midpoint of a side or edge of the bounding box 434, or other portion of the bounding box 434 or the identified object 432.

Then, the position of the object 432, e.g., a center 436 of the bounding box 434, may be compared to a center 440 of a field of view or the frame 430 of imaging data along a pan direction, e.g., a horizontal direction substantially parallel with ground, in order to determine a pan distance 437 between the object 432 and the center 440. If the pan distance 437 is greater than a threshold distance along the pan direction, it may be determined to adjust a pan orientation of the imaging device and movable base to at least partially align the position of the object 432 with the center 440 of the field of view or frame of imaging data. In various examples, the threshold distance may be a number of pixels, e.g., 40 pixels, 60 pixels, 80 pixels, 100 pixels, or other numbers of pixels, away from the center 440 of the field of view or frame along the pan direction. In other examples, the threshold distance may be expressed as a ratio, proportion, or percentage relative to a total width, or half the width, of the field of view or frame 430 along the pan direction. Various other example values or amounts may be used to define a threshold distance to initiate adjustment of the pan orientation of the imaging device and movable base.

In example embodiments, the adjustment to the pan direction may be substantially equal to the pan distance 437 between the position of the object 432 and the center 440 of the field of view or frame, such that the position of the object 432 may be substantially aligned with the center 440 of the field of view or frame along the pan direction. In other example embodiments, the adjustment to the pan direction may be some other value, amount, ratio, proportion, or percentage, e.g., 90%, 80%, 70%, 50%, or other values, ratios, or percentages, of the pan distance 437 between the position of the object 432 and the center 440 of the field of view or frame, such that the position of the object 432 may be moved closer to the center 440 of the field of view or frame along the pan direction.

In addition, the position of the object 432 may compared to a center 440 of a field of view or the frame 430 of imaging data along a tilt direction, e.g., a vertical direction substantially perpendicular to ground, in order to determine a tilt distance 438 between the object 432 and the center 440. If the tilt distance 438 is greater than a threshold distance along the tilt direction, it may be determined to adjust a tilt orientation of the imaging device and movable base to at least partially align the position of the object 432 with the center 440 of the field of view or frame of imaging data. In various examples, the threshold distance may be a number of pixels, e.g., 40 pixels, 60 pixels, 80 pixels, 100 pixels, or other numbers of pixels, away from the center 440 of the field of view or frame along the tilt direction. In other examples, the threshold distance may be expressed as a ratio, proportion, or percentage relative to a total height, or half the height, of the field of view or frame 430 along the tilt direction. Various other example values or amounts may be used to define a threshold distance to initiate adjustment of the tilt orientation of the imaging device and movable base.

In example embodiments, the adjustment to the tilt direction may be substantially equal to the tilt distance 438 between the position of the object 432 and the center 440 of the field of view or frame, such that the position of the object 432 may be substantially aligned with the center 440 of the field of view or frame along the tilt direction. In other example embodiments, the adjustment to the tilt direction may be some other value, amount, ratio, proportion, or percentage, e.g., 90%, 80%, 70%, 50%, or other values, ratios, or percentages, of the tilt distance 438 between the position of the object 432 and the center 440 of the field of view or frame, such that the position of the object 432 may be moved closer to the center 440 of the field of view or frame along the tilt direction.

In additional example embodiments, a size of the object 432 within the frame 430 of imaging data may be determined. For example, the size of the object 432 may be approximated to an area of the bounding box 434. In other example embodiments, the size of the object 432 may be calculated or determined in other manners, such as a width of the bounding box 434, a height of the bounding box 434, a diagonal dimension of the bounding box 434, a perimeter of the bounding box 434, or other calculation or approximation of one or more portions of the bounding box 434 or the identified object 432.

Then, the size of the object 432, e.g., an area of the bounding box 434, may be compared directly to one or more threshold values, or may be compared to an area or size of a field of view or an area or size of the frame 430 of imaging data, e.g., a total or maximum area or size of the frame. If the size of the object 432 is less than a threshold value or amount, it may be determined to adjust a zoom level of the imaging device to increase the zoom level, and correspondingly increase a size of the object 432 represented within the imaging data. Likewise, if the size of the object 432 is greater than a threshold value or amount, it may be determined to adjust a zoom level of the imaging device to decrease the zoom level, and correspondingly decrease a size of the object 432 represented within the imaging data. In various examples, the threshold value or amount may be a number of square pixels, e.g., 3000 square pixels, 4000 square pixels, 5000 square pixels, or other numbers of square pixels, associated with an area of the bounding box 434 positioned around the identified object 432. In other examples, the threshold value or amount may be expressed as a ratio, proportion, or percentage relative to a total area or size of the field of view or frame 430. Various other example values or amounts may be used to define a threshold value or amount to initiate adjustment of the zoom level of the imaging device.

In additional example embodiments, a first threshold value may be used to determine whether to increase a zoom level of the imaging device, and a second threshold value different from the first threshold value may be used to determine whether to decrease a zoom level of the imaging device. For example, the first threshold value may be less than the second threshold value to avoid or prevent frequent, repetitive, or continuous adjustment of the zoom level. In some examples, the first threshold value may be approximately 3000 square pixels, and the second threshold value may be approximately 5000 square pixels. Other examples may include other combinations of first and second threshold values associated with increasing and decreasing a zoom level, respectively.

In example embodiments, the adjustment to the zoom level may be substantially equal to or greater than a difference between the size of the object 432 and the threshold value associated with adjusting the zoom level, such that the size of the object 432 may be increased or decreased relative to a total area or size of the field of view or frame 430. In other example embodiments, the adjustment to the zoom level may be some other value, amount, ratio, proportion, or percentage, e.g., to increase or decrease a size of the object 432 to an approximate midpoint size or area between first and second thresholds, such that the size of the object 432 may be adjusted to reduce or minimize frequent, repetitive, or continuous adjustment of the zoom level.

In this manner, adjustments to a pan orientation, a tilt orientation, and/or a zoom level associated with the movable base and imaging device may be automatically determined over time to substantially maintain an identified object 432 at a desired size and within a field of view or frame 430, e.g., approximately centered within the frame 430 of imaging data, of the imaging device. Further, the adjustments to the pan orientation, the tilt orientation, and/or the zoom level associated with the movable base and imaging device may be automatically instructed via one or more actuators, motors, and/or zoom controllers to substantially track an object over time, e.g., to track a UAV as it performs various flight and navigation operations within an environment.

Although FIG. 4 and the description herein generally refers to identifying and tracking UAVs over time, other example embodiments of the automated identification and tracking systems and methods described herein may be used to identify and track various other types of objects, such as other types of airborne vehicles, ground-based vehicles, water-based vehicles, other types of vehicles, machinery, equipment, robots, or others automated machines or systems, objects associated with sports or sporting events, such as footballs, baseballs, basketballs, golf balls, hockey pucks, or others, animals, wildlife, fish, or birds in various indoor or outdoor environments, and/or various other types of objects that may move or travel over time.

Figure 5:
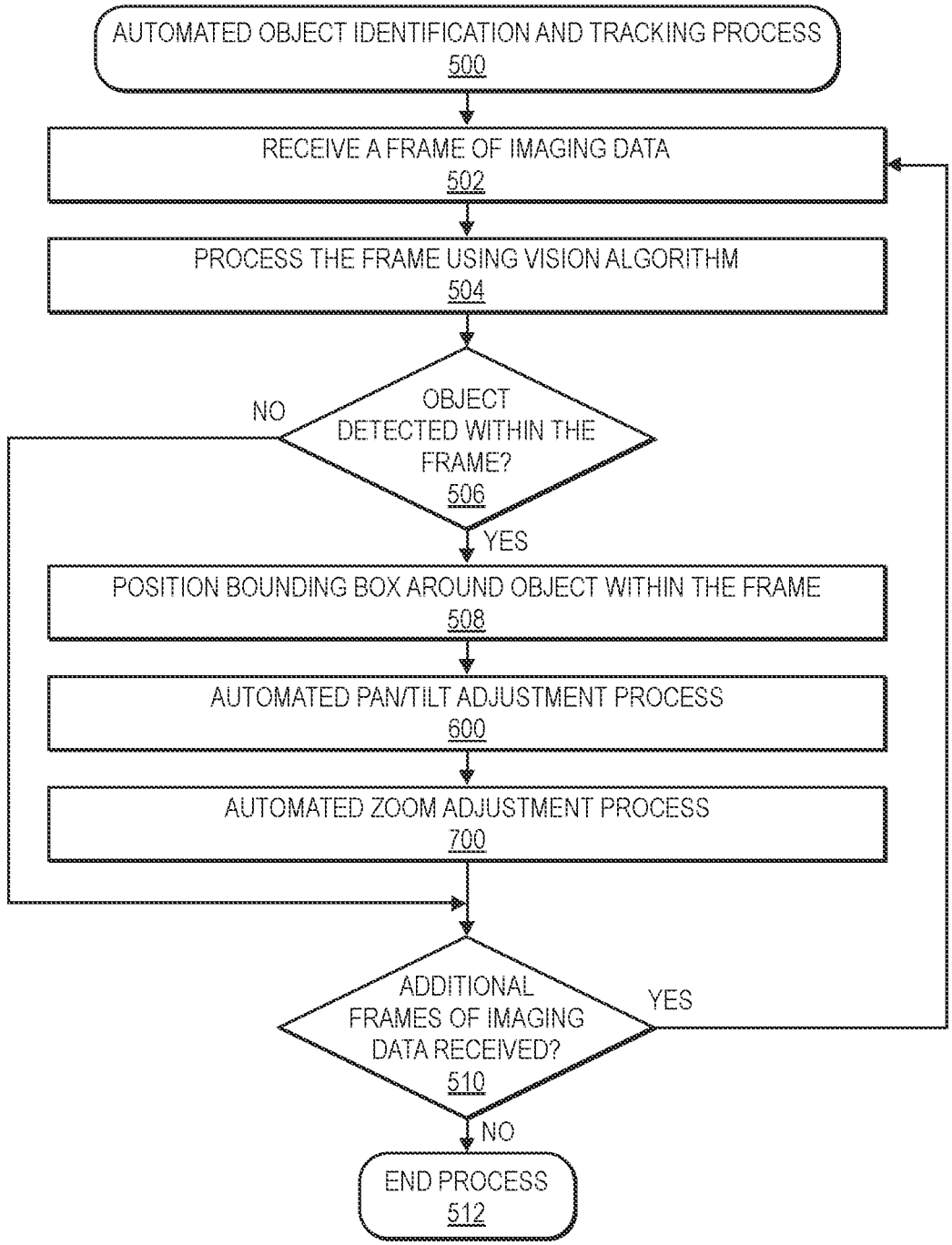
FIG. 5 is a flow diagram illustrating an example automated object identification and tracking process, in accordance with implementations of the present disclosure.

FIG. 5 is a flow diagram illustrating an example automated object identification and tracking process 500, in accordance with implementations of the present disclosure.

The process 500 may begin by receiving a frame of imaging data, as at 502. For example, an imaging device may capture imaging data, e.g., a plurality of frames of imaging data, and the imaging data may be transmitted or communicated to a controller associated with a movable base to which the imaging device is attached or coupled. The frame of imaging data may be transmitted in real-time, or near real-time, upon capture of the frame by the imaging device, such that the controller may receive the frame of imaging data very close to or nearly at a same time as a time of actual capture of the frame of imaging data. Further, the controller associated with the movable base may receive the frame of imaging data.

The process 500 may continue by processing the frame using a vision algorithm, as at 504. For example, the frame of imaging data received from the imaging device may be processed using one or more computer vision, machine learning, and/or other imaging data processing algorithms that may have been previously trained to identify one or more objects represented within imaging data. Some example imaging data processing algorithms may be trained to detect UAVs, other vehicles, equipment, machines, objects associated with sports or sporting events, animals, wildlife, or other living creatures, and/or other types of objects. Further, the controller may process the frame of imaging data using one or more computer vision, machine learning, and/or other imaging data processing algorithms.

The process 500 may proceed by determining whether an object is detected within the frame, as at 506. For example, an output associated with the one or more computer vision, machine learning, and/or other imaging data processing algorithms may indicate whether an object was detected or identified within the imaging data. If multiple objects were detected, one object may be selected or filtered out for further identification, e.g., based on confidence levels associated with the multiple objects. Further, a controller may receive and process the output associated with the one or more computer vision, machine learning, and/or other imaging data processing algorithms to determine whether an object is detected or identified within the frame of imaging data.

The process 500 may continue to position a bounding box around the object within the frame, as at 508. For example, based on the output associated with the one or more computer vision, machine learning, and/or other imaging data processing algorithms, a bounding box may be positioned around the identified object. As described herein, the bounding box may be sized and shaped to substantially enclose or surround an outer periphery of the identified object. In addition, the bounding box may have various shapes and sizes, such as square, rectangular, circular, oval, triangular, or other regular or irregular shapes. Further, a controller may generate and position a bounding box around the identified object within the frame of imaging data.

The process 500 may then proceed to an automated pan/tilt adjustment process, as at 600. The automated pan/tilt adjustment process, as further described herein at least with respect to FIG. 6, may determine a position of the identified object relative to a field of view or frame of the imaging data, and then determine whether to instruct an adjustment to a pan orientation and/or a tilt orientation based on the position of the identified object, in order to maintain the identified object within the field of view or frame, e.g., substantially or approximately centered within the field of view or frame. Further, a controller may execute or perform the automated pan/tilt adjustment process.

The process 500 may then continue with an automated zoom adjustment process, as at 700. The automated zoom adjustment process, as further described herein at least with respect to FIG. 7, may determine a size of the identified object relative to a field of view or frame of the imaging data, and then determine whether to instruct an adjustment to a zoom level based on the size of the identified object, in order to maintain the identified object at a desired size within the field of view or frame. Further, a controller may execute or perform the automated zoom adjustment process.

Responsive to completing the automated pan/tilt adjustment process 600 and/or the automated zoom adjustment process 700, and/or responsive to determining that no object has been identified within the frame, as at 506, the process 500 may proceed with determining whether one or more additional frames of imaging data are received for processing, as at 510. For example, if additional frames of imaging data are available, the process 500 may return to step 502 to receive and process one or more additional frames. If an object had been identified in a previously received frame of the imaging data, the process may continue to identify and track the identified object in one or more additional frames. If, however, an object had not been identified in a previously received frame of the imaging data, the process may attempt to again identify an object to be tracked over time. Further, a controller may determine whether one or more additional frames of imaging data are received for processing.

In further example embodiments, during tracking of an object over multiple frames of imaging data, the tracking of the object may become lost or undetermined due to various reasons, e.g., errors in the computer vision algorithm, errors in the pan, tilt, or zoom adjustments, sudden movements or changes of the object, occlusions, reflections, refractions, or other artifacts or issues associated with the imaging data, and/or various other reasons. If tracking of a previously detected object has been lost, the movable base and imaging device may perform various functions or operations to try to regain tracking of the object, such as panning in one or more directions, tilting in one or more directions, zooming out, zooming in, or various combinations of pan, tilt, and/or zoom, in order to substantially scan an environment for the previously detected object. In addition, the combinations of movements or adjustments may comprise circular, oval, rectangular, sweeping, scanning, or other types of movements to regain tracking of the previously detected object. In examples in which tracking of a previously detected object has become lost or undetermined, it may be determined that one or more additional frames of imaging data are received at step 510, in order to try to regain tracking of the previously detected object.

If, however, no additional frames of imaging data are received for processing, the process 500 may end, as at 512. For example, in some example embodiments related to tracking and capturing imaging data of aerial vehicles, upon determining that an aerial vehicle has landed at a landing location and stopped navigation, it may be determined that no additional frames of imaging data are to be received, such that the process 500 may end. In other example embodiments, no additional frames of imaging data may be received responsive to user input to cease automated object identification and tracking operations, e.g., a selection or actuation of a power button or input element associated with the movable base, the imaging device, and/or the remote control receiver, such that the process 500 may end.

Figure 6:
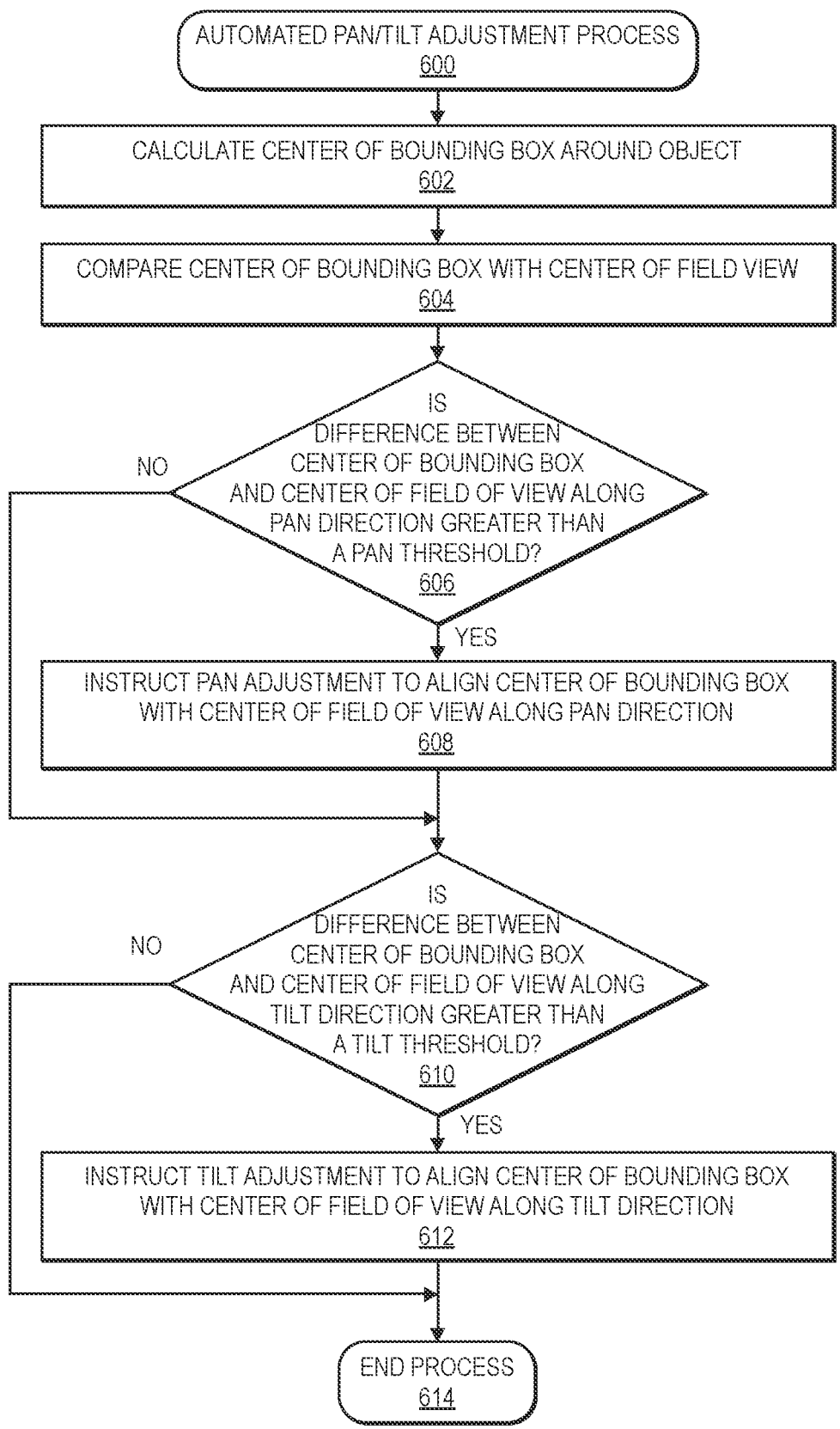
FIG. 6 is a flow diagram illustrating an example automated pan/tilt adjustment process, in accordance with implementations of the present disclosure.

FIG. 6 is a flow diagram illustrating an example automated pan/tilt adjustment process 600, in accordance with implementations of the present disclosure.

The process 600 may begin by calculating a center of a bounding box around an object, as at 602. For example, as described herein at least with respect to FIG. 5, an object may have been previously identified within a frame of imaging data, and a bounding box may also have been previously positioned around the identified object. The center of the bounding box may be calculated or determined based on the position and dimensions of the bounding box. Alternatively, other portions of the bounding box, e.g., corners, edges, sides, etc., may be calculated or determined based on the position and dimensions of the bounding box. Then, the center of the bounding box, or other determined portions of the bounding box, may be determined or designated as a position of the object within the frame of imaging data. Further, a controller may determine a position of the object based on a bounding box positioned around the object.

The process 600 may continue by comparing a center of the bounding box with a center of a field of view or frame of the imaging data, as at 604. For example, the center of the bounding box, e.g., the position of the object, may be compared with a center of the field of view, or a center of the frame of imaging data, in order to determine a distance or difference therebetween along a pan direction, e.g., to determine a pan distance. Likewise, the center of the bounding box, e.g., the position of the object, may be compared with a center of the field of view, or a center of the frame of imaging data, in order to determine a distance or difference therebetween along a tilt direction, e.g., to determine a tilt distance. Further, a controller may determine the pan and/or tilt distances between the position of the object and the center of the field of view or frame.

The process 600 may then proceed by determining whether a difference between the center of the bounding box and the center of the field of view along the pan direction is greater than a pan threshold, as at 606. For example, the pan distance may be compared with one or more threshold values or amounts, e.g., the pan threshold. If the pan distance is less than the pan threshold, the process may proceed to step 610. If, however, the pan distance is greater than the pan threshold, the process may proceed to step 608. Further, a controller may determine whether the pan distance is greater than one or more thresholds.

At step 608, the process 600 may instruct pan adjustment to align a center of the bounding box with a center of a field of view along the pan direction. For example, a pan orientation of the movable base and imaging device may be adjusted based on the pan distance, e.g., using one or more pan motors associated with the movable base. The adjustment may be substantially equal to the pan distance, or the adjustment may be other values, amounts, ratios, proportions, or percentages based on the pan distance. Further, a controller may instruct adjustment of the pan orientation to maintain tracking of the identified object.

In some examples, the adjustment may be executed or performed at a speed directly proportional to the pan distance, in which the speed of adjustment is equal to the pan distance divided by a constant value. As a result, the speed of adjustment may be determined to be relatively faster for longer pan distances and may be determined to be relatively slower for shorter pan distances.

In other examples, the adjustment may be executed or performed at a speed that varies continuously or discontinuously based on a remaining portion of the pan distance to be adjusted. As a result, the speed of adjustment may begin relatively faster at initially longer pan distances and may decrease to relatively slower speeds at subsequently shorter pan distances during the adjustment. Various other combinations or variations of speed of adjustment may be used to instruct adjustment of the pan orientation. Further, the speed of adjustment may also depend upon various other factors, such as a detected speed of movement of the identified object between frames of imaging data, actuation capabilities associated with the motors or actuators, or various other factors.

The process 600 may then continue with determining whether a difference between the center of the bounding box and the center of the field of view along the tilt direction is greater than a tilt threshold, as at 610. For example, the tilt distance may be compared with one or more threshold values or amounts, e.g., the tilt threshold. If the tilt distance is less than the tilt threshold, the process may proceed to step 614. If, however, the tilt distance is greater than the tilt threshold, the process may proceed to step 612. Further, a controller may determine whether the tilt distance is greater than one or more thresholds.

At step 612, the process 600 may instruct tilt adjustment to align a center of the bounding box with a center of a field of view along the tilt direction. For example, a tilt orientation of the movable base and imaging device may be adjusted based on the tilt distance, e.g., using one or more tilt motors associated with the movable base. The adjustment may be substantially equal to the tilt distance, or the adjustment may be other values, amounts, ratios, proportions, or percentages based on the tilt distance. Further, a controller may instruct adjustment of the tilt orientation to maintain tracking of the identified object.

In some examples, the adjustment may be executed or performed at a speed directly proportional to the tilt distance, in which the speed of adjustment is equal to the tilt distance divided by a constant value. As a result, the speed of adjustment may be determined to be relatively faster for longer tilt distances and may be determined to be relatively slower for shorter tilt distances.

In other examples, the adjustment may be executed or performed at a speed that varies continuously or discontinuously based on a remaining portion of the tilt distance to be adjusted. As a result, the speed of adjustment may begin relatively faster at initially longer tilt distances and may decrease to relatively slower speeds at subsequently shorter tilt distances during the adjustment. Various other combinations or variations of speed of adjustment may be used to instruct adjustment of the tilt orientation. Further, the speed of adjustment may also depend upon various other factors, such as a detected speed of movement of the identified object between frames of imaging data, actuation capabilities associated with the motors or actuators, or various other factors.

Responsive to completing the pan adjustment and/or tilt adjustment, and/or responsive to determining that no adjustments to pan and/or tilt orientations are to be instructed, the process 600 may then end, as at 614.

Figure 7:
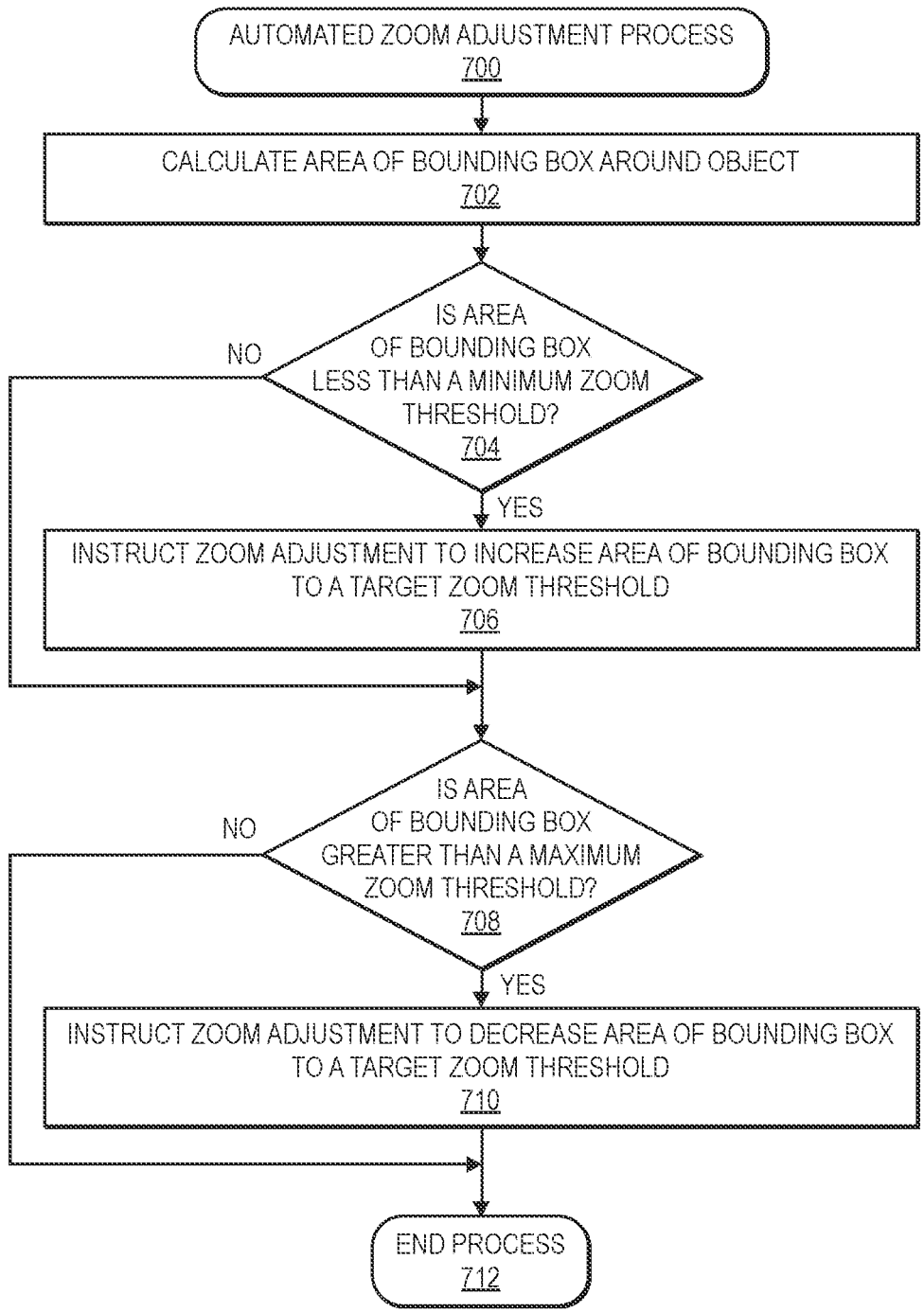
FIG. 7 is a flow diagram illustrating an example automated zoom adjustment process, in accordance with implementations of the present disclosure.

FIG. 7 is a flow diagram illustrating an example automated zoom adjustment process 700, in accordance with implementations of the present disclosure.

The process 700 may begin by calculating an area of a bounding box around an object, as at 702. For example, as described herein at least with respect to FIG. 5, an object may have been previously identified within a frame of imaging data, and a bounding box may also have been previously positioned around the identified object. The area of the bounding box may be calculated or determined based on the dimensions of the bounding box. Alternatively, other characteristics or aspects related to size of the bounding box, e.g., width, height, diagonal dimension, perimeter, etc., may be calculated or determined based on the dimensions of the bounding box. Then, the area of the bounding box, or other determined characteristic of the bounding box, may be determined or designated as a size of the object within the frame of imaging data. Further, a controller may determine a size of the object based on a bounding box positioned around the object.

The process 700 may then proceed by determining whether the area of the bounding box is less than a minimum zoom threshold, as at 704. For example, the size or area of the object may be compared with one or more minimum size or area threshold values or amounts, e.g., the minimum zoom threshold. If the size of the object is less than the minimum zoom threshold, the process may proceed to step 706. If, however, the size of the object is greater than the minimum zoom threshold, the process may proceed to step 708. Further, a controller may determine whether the size of the object is less than one or more minimum zoom thresholds.

At step 706, the process 700 may instruct zoom adjustment to increase the area of the bounding box to a target zoom threshold. For example, a zoom level of the imaging device may be adjusted based on the size of the object, e.g., using one or more zoom controllers, functions, or operations associated with the imaging device. The adjustment may be substantially equal to or greater than the difference between the size of the object and the minimum zoom threshold, or the adjustment may be other values, amounts, ratios, proportions, or percentages based on the size of the object and/or the minimum zoom threshold. Further, a controller may instruct adjustment of the zoom level to maintain tracking of the identified object.

In some examples, the adjustment may be executed or performed at a speed directly proportional to the difference between the size of the object and the minimum zoom threshold, in which the speed of adjustment is equal to the difference divided by a constant value. As a result, the speed of adjustment may be determined to be relatively faster for larger size differences and may be determined to be relatively slower for smaller size differences.

In other examples, the adjustment may be executed or performed at a speed that varies continuously or discontinuously based on a remaining portion of the difference between the size of the object and the minimum zoom threshold to be adjusted. As a result, the speed of adjustment may begin relatively faster at initially larger size differences and may decrease to relatively slower speeds at subsequently smaller size differences during the adjustment. Various other combinations or variations of speed of adjustment may be used to instruct adjustment of the zoom level. Further, the speed of adjustment may also depend upon various other factors, such as a detected rate of change in size of the identified object between frames of imaging data, actuation capabilities associated with the zoom controller, operation, or function, or various other factors.

The process 700 may then continue with determining whether the area of the bounding box is greater than a maximum zoom threshold, as at 708. For example, the size or area of the object may be compared with one or more maximum size or area threshold values or amounts, e.g., the maximum zoom threshold. If the size of the object is greater than the maximum zoom threshold, the process may proceed to step 710. If, however, the size of the object is less than the maximum zoom threshold, the process may proceed to step 712. Further, a controller may determine whether the size of the object is greater than one or more maximum zoom thresholds.

At step 710, the process 700 may instruct zoom adjustment to decrease the area of the bounding box to a target zoom threshold. For example, a zoom level of the imaging device may be adjusted based on the size of the object, e.g., using one or more zoom controllers, functions, or operations associated with the imaging device. The adjustment may be substantially equal to or greater than the difference between the size of the object and the maximum zoom threshold, or the adjustment may be other values, amounts, ratios, proportions, or percentages based on the size of the object and/or the maximum zoom threshold. Further, a controller may instruct adjustment of the zoom level to maintain tracking of the identified object.

In some examples, the adjustment may be executed or performed at a speed directly proportional to the difference between the size of the object and the maximum zoom threshold, in which the speed of adjustment is equal to the difference divided by a constant value. As a result, the speed of adjustment may be determined to be relatively faster for larger size differences and may be determined to be relatively slower for smaller size differences.

In other examples, the adjustment may be executed or performed at a speed that varies continuously or discontinuously based on a remaining portion of the difference between the size of the object and the maximum zoom threshold to be adjusted. As a result, the speed of adjustment may begin relatively faster at initially larger size differences and may decrease to relatively slower speeds at subsequently smaller size differences during the adjustment. Various other combinations or variations of speed of adjustment may be used to instruct adjustment of the zoom level. Further, the speed of adjustment may also depend upon various other factors, such as a detected rate of change in size of the identified object between frames of imaging data, actuation capabilities associated with the zoom controller, operation, or function, or various other factors.

Responsive to completing one or more zoom level adjustments, and/or responsive to determining that no adjustments to zoom levels are to be instructed, the process 700 may then end, as at 712.

Based at least on the methods and processes described herein at least with respect to FIGS. 5-7, adjustments to a pan orientation, a tilt orientation, and/or a zoom level associated with the movable base and imaging device may be automatically determined over time to substantially maintain an identified object at a desired size and within a field of view or frame, e.g., approximately centered within frames of imaging data, of the imaging device. Further, the adjustments to the pan orientation, the tilt orientation, and/or the zoom level associated with the movable base and imaging device may be automatically instructed via one or more actuators, motors, and/or zoom controllers to substantially track an object over time, e.g., to track a UAV as it performs various flight and navigation operations within an environment.

In further example embodiments, the imaging data, which is captured as a result of the substantially automatic and continuous identification and tracking of an object by a movable base and imaging device as described herein, may be transmitted, stored, analyzed, reviewed, or otherwise processed during engineering, design, development, and/or testing of objects, such as UAVs. For example, the imaging data of test flights or other operations may be reviewed and analyzed to identify events, issues, concerns, or other aspects of such operations, in order to facilitate improvements to the safety and operation of such UAVs. In other applications or environments, imaging data of industrial environments, outdoor environments, sporting events, or of other moving, movable, or traveling objects may also be reviewed and analyzed to facilitate improvements in safety and performance of various machinery, robots, or automated equipment, to enable improvements in safety and play of sporting events or games, to support conservation or preservation efforts for wildlife and other living creatures, to improve safety, urban planning, traffic flow, air traffic management, or other aspects related to vehicles and their operations, and/or to improve aspects of various other applications or environments.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 5-7, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An automated object identification and tracking system, comprising:
 a camera having a zoom controller; and
 a movable base operatively coupled to the camera, the movable base comprising:
  a power source;
  a first motor configured to adjust a pan orientation of the movable base;
  a second motor configured to adjust a tilt orientation of the movable base; and
  a controller;
  wherein the controller is configured to at least:
   receive imaging data from the camera;
   identify an object within the imaging data using a computer vision algorithm trained to detect the object;

determine a bounding box associated with the object within the imaging data;
determine at least one of a position or an area of the bounding box within a field of view of the camera by at least:
  determining a center of the bounding box associated with the object;
  determining a distance between the center of the bounding box and a center of the field of view of the camera along at least one of a pan direction or a tilt direction; and
  determining that the distance between the center of the bounding box and the center of the field of view along at least one of the pan direction or the tilt direction is greater than a threshold distance; and
instruct at least one of adjustment of the pan orientation by the first motor, adjustment of the tilt orientation by the second motor, or adjustment of a zoom level by the zoom controller of the camera based on at least one of the position or the area of the bounding box within the field of view of the camera.

2. The automated object identification and tracking system of claim 1, wherein the power source of the movable base is operatively coupled to the camera to provide power to the camera.

3. The automated object identification and tracking system of claim 1, wherein the controller is operatively coupled to the camera to instruct adjustment of the zoom controller of the camera.

4. The automated object identification and tracking system of claim 1, wherein the first motor and the second motor comprise at least one of servo motors, stepper motors, or brushless motors.

5. The automated object identification and tracking system of claim 1, wherein the position of the bounding box is determined relative to the center of the field of view of the camera; and
wherein the area of the bounding box is determined relative to an area of the field of view of the camera.

6. A system, comprising:
a base configured to operatively couple to an imaging device, the base comprising:
  a first motor configured to adjust a pan orientation of the base;
  a second motor configured to adjust a tilt orientation of the base; and
  a controller configured to at least:
    receive imaging data captured by the imaging device;
    process the imaging data to identify an object within the imaging data;
    determine a bounding box associated with the object within the imaging data;
    determine a position of the object within the imaging data by at least:
      determining a center of the bounding box associated with the object;
      determining a distance between the center of the bounding box and a center of a field of view of the imaging device along at least one of a pan direction or a tilt direction; and
      determining that the distance between the center of the bounding box and the center of the field of view along at least one of the pan direction or the tilt direction is greater than a threshold distance;
    determine an adjustment to at least one of the pan orientation or the tilt orientation based on the position of the object; and
    instruct adjustment of at least one of the pan orientation or the tilt orientation by at least one of the first motor or the second motor.

7. The system of claim 6, wherein the base further comprises:
a power source configured to provide power to the first motor, the second motor, the controller, and the imaging device operatively coupled to the base.

8. The system of claim 6, wherein the first and second motors comprise at least one of servo motors, stepper motors, or brushless motors.

9. The system of claim 6, wherein the controller is configured to identify the object within the imaging data using a computer vision algorithm that is trained to identify at least the object within imaging data.

10. A system, comprising:
a base configured to operatively couple to an imaging device, the base comprising:
  a first motor configured to adjust a pan orientation of the base;
  a second motor configured to adjust a tilt orientation of the base; and
  a controller configured to at least:
    receive imaging data captured by the imaging device;
    process the imaging data to identify an object within the imaging data;
    determine a position of the object within the imaging data;
    determine an adjustment to at least one of the pan orientation or the tilt orientation based on the position of the object; and
    instruct adjustment of at least one of the pan orientation or the tilt orientation by at least one of the first motor or the second motor;
  wherein the controller is configured to instruct adjustment of at least one of the pan orientation or the tilt orientation by at least one of the first motor or the second motor at a speed that is based at least in part on the position of the object within the imaging data.

11. The system of claim 6, wherein the base is configured to operatively couple to a zoom controller of the imaging device; and
wherein the controller is further configured to at least:
  determine a size of the object within the imaging data;
  determine an adjustment to a zoom level based on the size of the object; and
  instruct adjustment of the zoom level by the zoom controller.

12. The system of claim 11, wherein the controller is configured to determine the size of the object within the imaging data by at least:
determining an area of the bounding box associated with the object; and
determining that the area of the bounding box is less than a first threshold value or greater than a second threshold value;
wherein the adjustment of the zoom level is determined based on the area of the bounding box.

13. A method, comprising:
receiving, by a controller associated with a base, imaging data captured by an imaging device, wherein the base is configured to operatively couple to the imaging device;
processing, by the controller, the imaging data to identify an object within the imaging data;
determining, by the controller, a bounding box associated with the object within the imaging data;
determining, by the controller, a position of the object within the imaging data by at least:
  determining a center of the bounding box associated with the object;
  determining at least one distance between the center of the bounding box and a center of the imaging data along at least one of a pan direction or a tilt direction; and
  determining that the at least one distance between the center of the bounding box and the center of the imaging data along at least one of the pan direction or the tilt direction is greater than at least one threshold distance;
determining, by the controller, an adjustment to at least one of a pan orientation or a tilt orientation based on the position of the object; and
instructing, by the controller via at least one of a first motor or a second motor associated with the base, adjustment of at least one of the pan orientation or the tilt orientation.

14. The method of claim 13, further comprising:
determining, by the controller, a size of the object within the imaging data;
determining, by the controller, an adjustment to a zoom level based on the size of the object; and
instructing, by the controller via a zoom controller associated with the imaging device, adjustment of the zoom level.

15. The method of claim 14, wherein determining the size of the object further comprises:
determining an area of the bounding box associated with the object;
determining a ratio between the area of the bounding box and an area of the imaging data; and
determining that the ratio between the area of the bounding box and the area of the imaging data is less than a first threshold ratio or greater than a second threshold ratio;
wherein the adjustment of the zoom level is determined based on the ratio between the area of the bounding box and the area of the imaging data.

16. The system of claim 10, wherein the speed is equal to at least one of a pan distance or a tilt distance divided by a constant value.

17. The system of claim 16, wherein the pan distance is a distance between a center of a bounding box associated with the object and a center of a field of view of the imaging device along a pan direction; and
wherein the tilt distance is a distance between the center of the bounding box associated with the object and the center of the field of view of the imaging device along a tilt direction.

18. The system of claim 10, wherein the speed varies at least one of continuously or discontinuously based on a remaining portion of at least one of a pan distance or a tilt distance.

19. The system of claim 10, wherein the controller is configured to instruct adjustment of a zoom level at a second speed that is based at least in part on a size of the object within the imaging data.

20. The system of claim 19, wherein the second speed is equal to a difference between the size of the object and at least one of a minimum zoom threshold or a maximum zoom threshold divided by a constant value; or
wherein the second speed varies at least one of continuously or discontinuously based on a remaining portion of the difference.

* * * * *